United States Patent
Ishii et al.

(10) Patent No.: US 7,433,496 B2
(45) Date of Patent: Oct. 7, 2008

(54) IN-VEHICLE IMAGE CORRECTING DEVICE AND NIGHT DRIVING VIEW FIELD SUPPORTING DEVICE

(75) Inventors: Koji Ishii, Shizuoka (JP); Masayuki Ogawa, Shizuoka (JP)

(73) Assignee: Yazaki Corportion, Tokyo (JP)

( * ) Notice: Subject to any disclaimer, the term of this patent is extended or adjusted under 35 U.S.C. 154(b) by 987 days.

(21) Appl. No.: 10/327,897

(22) Filed: Dec. 26, 2002

(65) Prior Publication Data

US 2003/0123752 A1 Jul. 3, 2003

(30) Foreign Application Priority Data

Dec. 28, 2001 (JP) .............................. 2001-400275

(51) Int. Cl.
*G06K 9/00* (2006.01)
(52) U.S. Cl. ................... 382/104; 348/115; 348/142; 348/143; 348/155; 382/103; 382/154
(58) Field of Classification Search ............... 340/436, 340/905; 345/7; 348/142, 154, 174, 148, 348/149, 152, 115, 143, 155; 362/510, 512; 382/103, 104, 154, 165, 260, 286, 167, 263, 382/274
See application file for complete search history.

(56) References Cited

U.S. PATENT DOCUMENTS

| | | | | |
|---|---|---|---|---|
| 5,332,176 A | * | 7/1994 | Wootton et al. | 244/3.11 |
| 5,608,823 A | * | 3/1997 | Ohtani | 382/271 |
| 5,637,040 A | * | 6/1997 | Kim et al. | 454/256 |
| 5,768,412 A | * | 6/1998 | Mitsuyama et al. | 382/173 |
| 5,809,161 A | * | 9/1998 | Auty et al. | 382/104 |
| 5,831,669 A | * | 11/1998 | Adrain | 348/143 |
| 5,915,032 A | * | 6/1999 | Look | 382/100 |
| 5,981,949 A | * | 11/1999 | Leahy et al. | 250/332 |
| 6,044,204 A | * | 3/2000 | Takamatsu et al. | 358/1.9 |
| 6,124,864 A | * | 9/2000 | Madden et al. | 345/473 |
| 6,163,309 A | * | 12/2000 | Weinert | 345/7 |
| 6,233,062 B1 | * | 5/2001 | Takamatsu et al. | 358/463 |
| 6,249,298 B1 | * | 6/2001 | Castegnier et al. | 347/188 |

(Continued)

FOREIGN PATENT DOCUMENTS

DE 40 07 646 A1 9/1991

(Continued)

OTHER PUBLICATIONS

German Office Action dated Jan. 12, 2006 with English Translation, 13 pages.

(Continued)

*Primary Examiner*—Gregory M Desire
(74) *Attorney, Agent, or Firm*—Kratz, Quintos & Hanson, LLP.

(57) ABSTRACT

An in-vehicle image correcting device for correcting an image picked up by a near-infrared camera ahead of one's own vehicle in which an obstacle is difficult for a driver to visually recognize captures the image picked up by the near-infrared camera; and corrects the image captured by the image capturing means so that a density of a pixel having a higher density than an obstacle density representative of the density of a pixel corresponding to the obstacle becomes lower than the obstacle density. In this configuration, the image picked up by the near-infrared camera is corrected so that the obstacle can be easily recognized.

9 Claims, 21 Drawing Sheets

U.S. PATENT DOCUMENTS

| | | | |
|---|---|---|---|
| 6,323,761 B1 * | 11/2001 | Son | 340/426.35 |
| 6,420,704 B1 * | 7/2002 | Berenz et al. | 250/330 |
| 6,434,254 B1 * | 8/2002 | Wixson | 382/103 |
| 6,531,959 B1 * | 3/2003 | Nagaoka et al. | 340/435 |
| 6,535,242 B1 * | 3/2003 | Strumolo et al. | 348/148 |
| 6,538,622 B1 * | 3/2003 | Kojima et al. | 345/7 |
| 6,608,941 B1 * | 8/2003 | Suzuki et al. | 382/272 |
| 6,623,148 B2 * | 9/2003 | Yagi et al. | 362/510 |
| 6,634,776 B2 * | 10/2003 | Yagi et al. | 362/510 |
| 6,644,840 B2 * | 11/2003 | Yagi et al. | 362/510 |
| 6,650,437 B1 * | 11/2003 | Nakajima | 358/1.9 |
| 6,658,150 B2 * | 12/2003 | Tsuji et al. | 382/218 |
| 6,700,124 B1 * | 3/2004 | Mekata et al. | 250/351 |
| 6,731,407 B1 * | 5/2004 | Hayama | 358/3.2 |
| 6,731,436 B2 * | 5/2004 | Ishii et al. | 359/630 |
| 6,734,896 B2 * | 5/2004 | Nobori et al. | 348/148 |
| 6,825,469 B2 * | 11/2004 | Yamaguchi et al. | 250/330 |
| 6,855,934 B2 * | 2/2005 | Mekata et al. | 250/352 |
| 7,106,374 B1 * | 9/2006 | Bandera et al. | 348/308 |
| 2003/0123752 A1 * | 7/2003 | Ishii et al. | 382/286 |
| 2003/0128436 A1 * | 7/2003 | Ishii et al. | 359/630 |
| 2005/0133709 A1 * | 6/2005 | Mekata et al. | 250/252.1 |
| 2006/0176210 A1 * | 8/2006 | Nakamura et al. | 342/45 |

FOREIGN PATENT DOCUMENTS

| | | |
|---|---|---|
| DE | 196 09 488 A1 | 10/1996 |
| DE | 695 06 174 T2 | 4/1999 |
| DE | 100 30 421 A1 | 1/2001 |
| DE | 199 55 919 C1 | 5/2001 |
| DE | 100 16 184 A1 | 10/2001 |
| WO | WO 97/20433 | 6/1997 |

OTHER PUBLICATIONS

Patent Abstracts of Japan, JP 11-243538 A, Nissan Motor Co Ltd., Sep. 7, 1999, 1 page.

* cited by examiner

IN-VEHICLE IMAGE CORRECTING DEVICE AND NIGHT DRIVING VIEW FIELD SUPPORTING DEVICE

BACKGROUND OF THE INVENTION

1. Field of the Invention

This invention relates to an image correcting device for a motor vehicle (referred to as in-vehicle image collecting device) and a night driving view field supporting device. More particularly, this invention relates to an in-vehicle image correcting device for correcting an image ahead of one's own vehicle in which an obstacle is difficult for a driver to visually recognize and is picked up by a near-infrared camera so that it can be visually recognized by the driver. This invention also relates to a night driving view field supporting device for supporting the driving field of the driver at night in such a way that the image picked up by the near-infrared camera is displayed on a head-up display device.

2. Description of the Related Art

In recent years, in order to improve the visibility of a driver, a projecting type display unit called a head-up display device (HUD) which displays a virtual image reflected from a front glass has been adopted in some models of motor vehicles.

It is generally accepted that a human being receives the main information from this world by visual sense so that during driving the importance of the visual sense has increased greatly. As the driver senses the obstacle earlier in a moving direction, he can deal with the obstacle with adequate time. Therefore, a night driving view field supporting device (night vision) for supporting safe driving has been proposed for the purpose of assuring the view field at night or under adverse conditions.

This device includes an infrared camera attached to the front of a vehicle, a computer and the above HUD. The image representative of infrared rays (heat) emitted by objects collected by the infrared camera appears as a monochromatic image on the HUD. Therefore, the driver recognizes invisible obstacles in the dark, and those ahead of one's own vehicle when the view field is not clear because of rain and fog.

However, the infrared camera used in the night driving view field supporting device detects heat of an object to be picked up and displays it as a display brightness difference (a hot object appears bright). An obstacle such as a living thing, which generates heat poses no problem. However, an obstacle which does not generate heat or gives a small temperature difference from an ambient temperature may not appear bright. A walker who wears cold-proof clothing does not appear bright.

In order to obviate such an inconvenience, a near-infrared camera has been proposed as a camera. However, if the monochromatic image captured by the near-infrared camera is displayed as it is on the HUD, in addition to the obstacle, a street lamp and headlight of an oncoming cars all of which generate a large quantity of lights appear to overflow. Such an appearance makes it difficult for the driver to recognize the obstacle. Thus, the night driving view field supporting device cannot achieve the essential object.

SUMMARY OF THE INVENTION

An object of this invention is to provide an in-vehicle image correcting device which can correct an image to permit an obstacle to be easily recognized and a night driving view field supporting device which permits a driver to recognize an obstacle surely.

In order to attain the above object, as shown in FIG. 1 which is an basic arrangement view of this invention, there is provided an in-vehicle image correcting device for correcting an image picked up by a near-infrared camera ahead of one's own vehicle in which an obstacle is difficult for a driver to visually recognize, comprising:

image capturing means $21a1$ for capturing the image picked up by the near-infrared camera; and correcting means $21a2$ for correcting the image captured by the image capturing means so that a density of a pixel having a higher density than an obstacle density representative of the density of a pixel corresponding to the obstacle becomes lower than the obstacle density.

In accordance with the in-vehicle image correcting device described above, the image captured by the image capturing means $21a1$ is corrected so that a density of a pixel having a higher density than an obstacle density representative of the density of a pixel corresponding to the obstacle becomes lower than the obstacle density. In this configuration, if the image picked up by the near-infrared camera includes the pixel having the higher density than that of the pixel (obstacle density) corresponding to the obstacle, the image is corrected so that the density of the former becomes lower than the obstacle density. For this reason, the image picked up by the near-infrared camera can be made from which the obstacle can be easily recognized. Accordingly, even when an object having a higher brightness than that of the obstacle, such as the headlight of an on-coming car, street light, etc., is picked up by the near-infrared camera, the image shows the obstacle clearly so that the obstacle can be easily recognized.

As seen from the basic arrangement view of FIG. 1, the in-vehicle image correcting device described above preferably further comprises:

defining means $21a3$ for defining the obstacle density on the basis of a distribution of densities of pixels constituting the image captured by the image capturing means, and the correcting means corrects the image captured by the image capturing means on the basis of the obstacle density defined by the defining means.

In accordance with the in-vehicle image correcting device described just above, when the image is captured by the image capturing means, the distribution of densities of pixels constituting the image is created and the obstacle density is created on the basis of the distribution by the defining means $21a3$. In this case, because the obstacle density is defined on the basis of the distribution of the densities of the pixels which constitute the captured image, an obstacle density suitable to the captured image can be automatically calculated. Thus, because the image is corrected on the basis of the obstacle density suitable to the captured image, the obstacle can be recognized more easily from a clear image.

As seen from the basic arrangement view of FIG. 1, in the in-vehicle image correcting device, preferably, the correcting means $21a2$ corrects the image captured by the image capturing means $21a1$ for a specified area in which a pixel density becomes low radially.

In accordance with the in-vehicle image correcting device, when the image is captured by the image capturing means $21a1$, the area in which a pixel density becomes low radially is specified from the image, and the image in the specified area is corrected so that the pixel having a higher density than an obstacle density representative of the density of a pixel corresponding to the obstacle becomes lower than the obstacle density. In this configuration, the areas in each of which the pixel density becomes radially low, i.e. areas with the displayed headlight, street light, etc. are defined in the image, and the correction for the areas is made. For this reason, the objects other than the obstacle can be excluded from the image and be made inconspicuous. Thus, since the captured image is corrected into an image from which only the obstacle can be visually recognized, the obstacle can be recognized more surely.

As seen from the basic arrangement view of FIG. 1, preferably, the in-vehicle image correcting device further comprises:

an adjusting means 21a4 which when a boundary on the image is detected in which a density difference between adjacent pixels which exceeds a prescribed value for the image corrected by the correcting means, adjusts the density of the pixel with the higher density in the vicinity of the boundary so that it becomes gradually low over a prescribed range from the boundary.

In accordance with the in-vehicle image correcting device as described just above, when a boundary on the image is detected in which a density difference between adjacent pixels which exceeds a prescribed value for the image corrected by the correcting means, the density of the pixel with the higher density in the vicinity of the boundary is adjusted so that it becomes gradually low from the boundary over a prescribed range. In this way, when the boundary where a density difference between the adjacent pixels is detected, the density of the pixel with the higher density in the vicinity of the boundary is corrected to a lower density. By this correction, the image can be created in which an abrupt change in the density between the adjacent pixels does not appear. Further, if the density is adjusted so as to vary gradually, good appearance is obtained. Therefore, the correction is made on the basis of the obstacle density and in addition, when the density difference between the adjacent pixels exceeds a prescribed value, the adjustment is made. Thus, the correction can be made so that the density is greatly lowered. Accordingly, the obstacle can be recognized more easily from the clear image.

As seen from a basic arrangement view of FIG. 2, in accordance with this invention, there is provided an in-vehicle image correcting device for correcting an image picked up by a near-infrared camera ahead of one's own vehicle in which an obstacle is difficult for a driver to visually recognize, comprising:

image capturing means 21a1 for capturing the image picked up by the near-infrared-camera;

road area detecting means 21a5 for detecting a road area representative of a road on the image captured by the image capturing means;

unnecessary area specifying means 21a6 for specifying an unnecessary area of the image which may not be visually recognized by the driver on the basis of the road area detected by the road area detecting means; and correcting means 21a2 for correcting the image captured by the image capturing means so that the pixel corresponding to the unnecessary area specified by the unnecessary area specifying means has a density lower than an obstacle density representative of a density of the pixel corresponding to the obstacle.

In the in-vehicle image correcting device described just above, when the image is captured by the image capturing means 21a1, the road area indicative of the road on the image is detected by detecting the white lines and road shoulders by the road area detecting means 21a5. The unnecessary area which may not be visually recognized by the driver, i.e. the area other than the road and its vicinity is specified by the unnecessary area specifying means 21a6. The image is corrected by the correcting means 21a2 so that the pixel corresponding to the specified unnecessary area has a density lower than an obstacle density representative of a density of the pixel corresponding to the obstacle. In this configuration, the road area is specified from the image picked up by the near-infrared camera; on the basis of the specified road area, the unnecessary area of the image which may not be visually recognized by the driver is specified; and the specified unnecessary area of the image is corrected in such a manner that the density of the pixel is not higher than the obstacle density. For this reason, the image picked up by the near-infrared camera can be made which permits the obstacle to be easily recognized. Further, since the street lights are commonly displayed in the upper part of the screen, by specifying the unnecessary area above the road area, the objects which impedes the visual recognition can be excluded or made inconspicuous. Thus, even when the street lights along the road and others which have higher luminance than the obstacle are picked up by: the near-infrared camera 10, the image clearly shows the obstacle so that the obstacle can be easily recognized.

As seen from the basic arrangement view of FIG. 2, preferably, the in-vehicle image correcting means further comprises obstacle area detecting means 21a7 for detecting an obstacle area corresponding to the obstacle on the image captured by the image capturing means, and the unnecessary area specifying means specifies the unnecessary area on the basis of the obstacle area specified by the unnecessary area specifying means.

In accordance with the in-vehicle image correcting device described just above, the obstacle area corresponding to an obstacle on the image captured by the image capturing means is detected by the obstacle area detecting means 21a7. The unnecessary area is specified on the basis of the obstacle area and road area by the unnecessary area specifying means 21a6. In this configuration, the road area and obstacle area are specified from the image captured by the near-infrared camera, and the unnecessary area which may not be visually recognized by the driver on the basis of these road area and obstacle area. This surely prevents the obstacle from being included in the unnecessary area so that the obstacle can be recognized more easily.

Further, in order to attain the above object, there is provided an in-vehicle image correcting device for correcting an image picked up by a near-infrared camera ahead of one's own vehicle in which an obstacle is difficult for a driver to visually recognize, comprising:

image capturing means 21a1 for capturing the image picked up by the near-infrared camera;

irradiated area information storing means 21b1 for storing irradiated area information representative of an irradiated area irradiated with a headlight of one's own vehicle on the image captured by the image capturing means; and correcting means 21a2 for correcting the image captured by the image capturing means so that the pixel corresponding to the irradiated area has a lower density than an obstacle density representative of the density of a pixel corresponding to an obstacle.

In accordance with the in-vehicle image correcting device described just above, the irradiated area information representative of an irradiated area irradiated with a headlight of one's own vehicle on the image is stored in the irradiated information storing means 21b1. When the image is captured by the image capturing means 21a1, the image is corrected by the correcting means 21a2 so that the pixel corresponding to the irradiated area has a lower density than an obstacle density representative of the density of a pixel corresponding to an obstacle. In this configuration, since the area irradiated with the headlight of one's own vehicle can be visually recognized by the driver, the irradiated area information indicative of this area is previously stored. The captured image is corrected in such a manner that the density of the pixel corresponding to the area irradiated with a headlight of one's own vehicle is lower than the obstacle density of the pixel corresponding to the obstacle. For this reason, the image picked up by the near-infrared camera can be made which permits-the obstacle to be easily recognized. Thus, even when the object such as the headlights of the on-coming car which have higher luminance than the obstacle are picked up by the near-infrared camera, the image clearly shows the obstacle so that the obstacle can be easily recognized.

In accordance with this invention, there is also provided an night driving view field supporting device including any one of the in-vehicle image correcting devices described above comprising:

a head up display 30 on which the image picked up by the near-infrared camera and corrected by the in-vehicle image correcting device is displayed so that a driving view field is supported during night driving.

In accordance with the night driving view field supporting device described just above, the image ahead of one's own vehicle picked up by the near-infrared camera 10 is corrected by the in-vehicle image correcting device 10 so that a density of a pixel having a higher density than an obstacle density representative of the density of a pixel corresponding to the obstacle becomes lower than the obstacle density, and the corrected image is displayed by the head-up display 30. In this configuration, if the image picked up by the near-infrared camera includes the pixel having the higher density than that of the pixel (obstacle density) corresponding to the obstacle, the image is corrected so that the density of the former becomes lower than the obstacle density, and the corrected image is displayed on the head up display 30. For this reason, the image picked up by the near-infrared camera can be made from which the obstacle can be easily recognized. Further, even when an inexpensive near-infrared camera is used, since the image is corrected by the in-vehicle image correcting device, a night driving view field supporting device can be provided by which the obstacle can be easily recognized. Accordingly, since the obstacle can be displayed on the head up display 30 more clearly than the street light and headlight of an on-coming car providing a large quantity of light, the obstacle can be visually recognized surely by the driver. This more surely supports the driving view field of the driver at night.

The above and other objects and features of the invention will be more apparent from the following description taken in conjunction with the accompanying drawings.

DESCRIPTION OF THE PREFERRED EMBODIMENTS

Referring to FIGS. 5 to 25, an explanation will be given of various embodiments of the night driving view field supporting device according to this invention.

Figure 5:
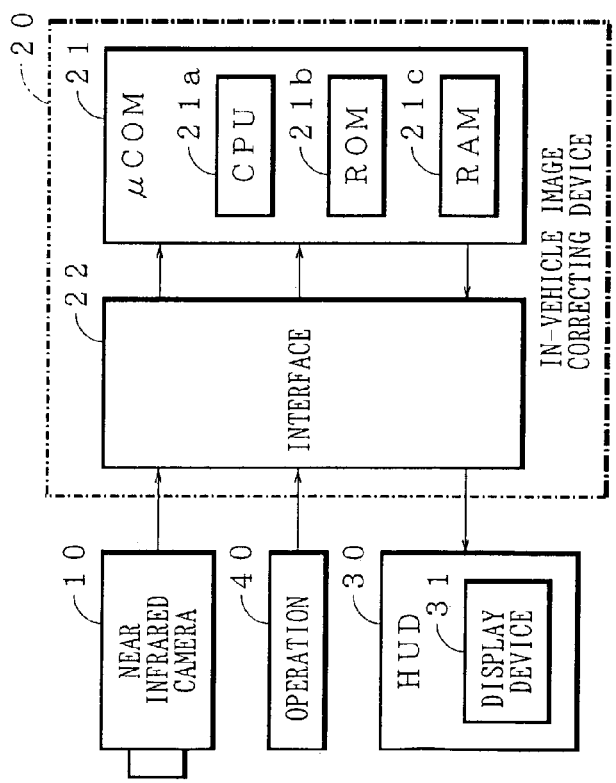
FIG. 5 is an arrangement view showing the schematic arrangement of a night driving view field supporting device according to this invention.

As seen from FIG. 5, the night driving view field supporting device (night vision) according to this invention includes a near-infrared camera 10, an in-vehicle image correcting device 20, a head-up display device (HUD) 30 and an operation unit 40.

The near-infrared camera 10 as is well known, is a camera capable of picking up the light to a near-infrared range, which can pick up an object without causing a walker or oncoming car to feel glare by projecting infrared rays as auxiliary light onto the scene ahead of a vehicle. Whenever the near-infrared camera 10 picks up the image ahead of the vehicle, it supplies the image to the in-vehicle image correcting device 20. By adopting the near-infrared camera 10 in place of a far infrared camera which is more expensive than the near-infrared camera, production cost of the night driving view field supporting device can be reduced.

The in-vehicle image correcting device 20 incorporates a microcomputer (μCOM) 21 which operates according to a prescribed program. The μCOM 21 as is well known, incorporates a central processing unit (CPU) 21a which performs various kinds of processing and control according to a prescribed program, a ROM 21b which is a read only memory storing programs for the CPU 21a, and a RAM 21c which is a readable/writable memory storing various kinds of data and having an area necessary for processing for the processing by the CPU 21a.

The in-vehicle image correcting device 20 also includes an interface unit 22 connected to the μCOM 21. The interface unit 22 is connected to the infrared camera 10, HUD 30, and operation unit 40. Various items of information from the near-infrared camera 10 and operation unit 40 is supplied to the μCOM 21 via the interface unit 22. The information such as an image is supplied from the to the μCOM 21 to HUD 30.

The HUD 30, as well known, is a device which projects the image from the near-infrared camera 10 onto a projecting area of the front glass of the vehicle so that the image is superposed on the scene ahead of the vehicle seen from the eye point through the front glass. The HUD 30 incorporates a display device which may be e.g. FE (field emission) display, a fluorescence display tube, EL (electro luminescence) display, a liquid crystal display equipped with a backlight, etc. The display device 31 is installed within a dashboard and projects the image outputted from the A COM 21 onto a combiner or the front glass.

The operation unit 40 has a plurality of switches or buttons for manually operating the start and end of the display for the HUD 30. The operation unit 40 is attached to e.g. the steering wheel of the vehicle. The operation unit 40 is manually ON/OFF operated by a driver. The status information indicative of the ON/OFF status of the operation unit 40 is supplied to the μ COM 21.

Embodiment 1

Figure 6:
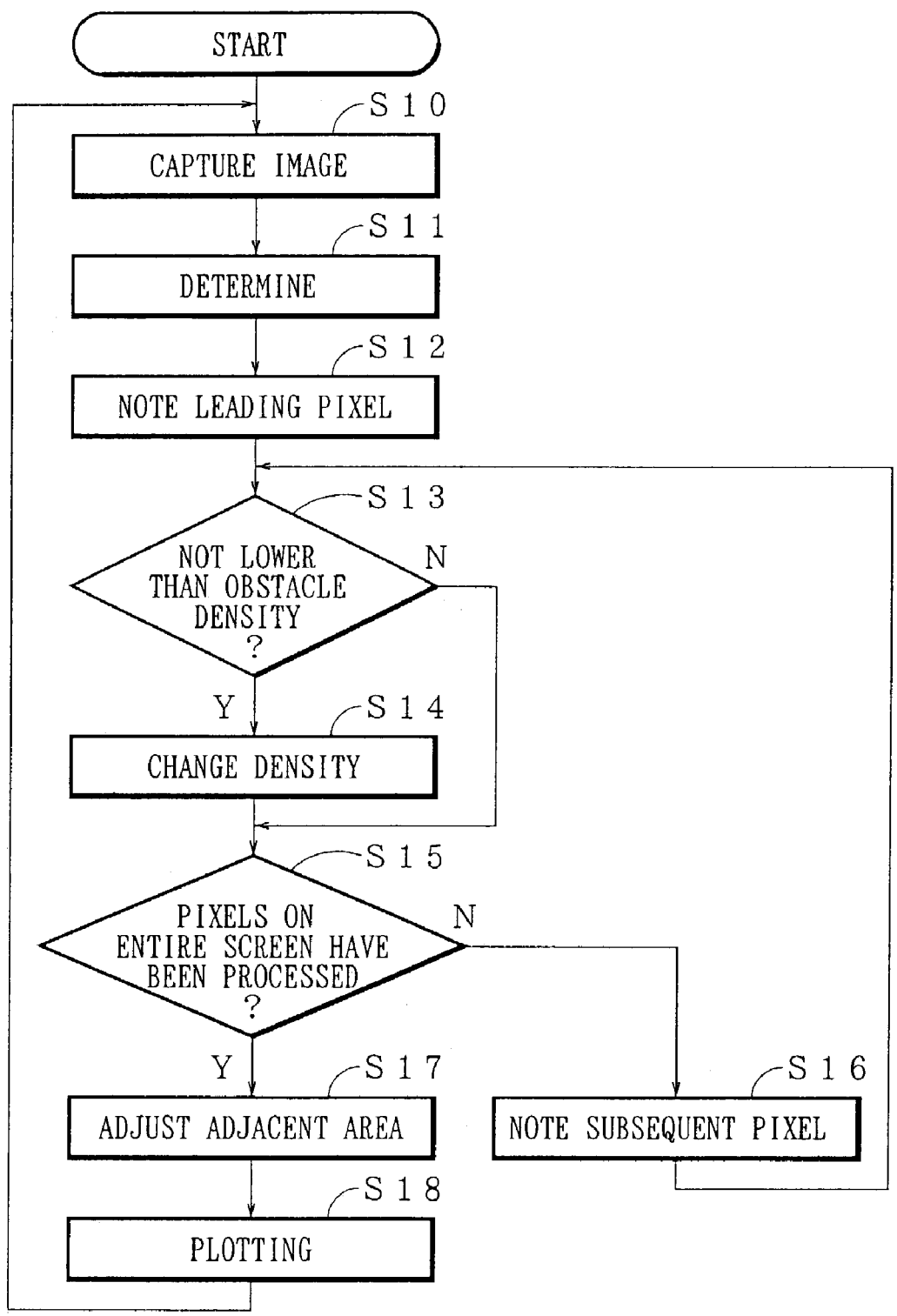
FIG. 6 is a flowchart showing an example of the processing in a first embodiment executed by CPU shown in FIG. 5.
Figure 7:
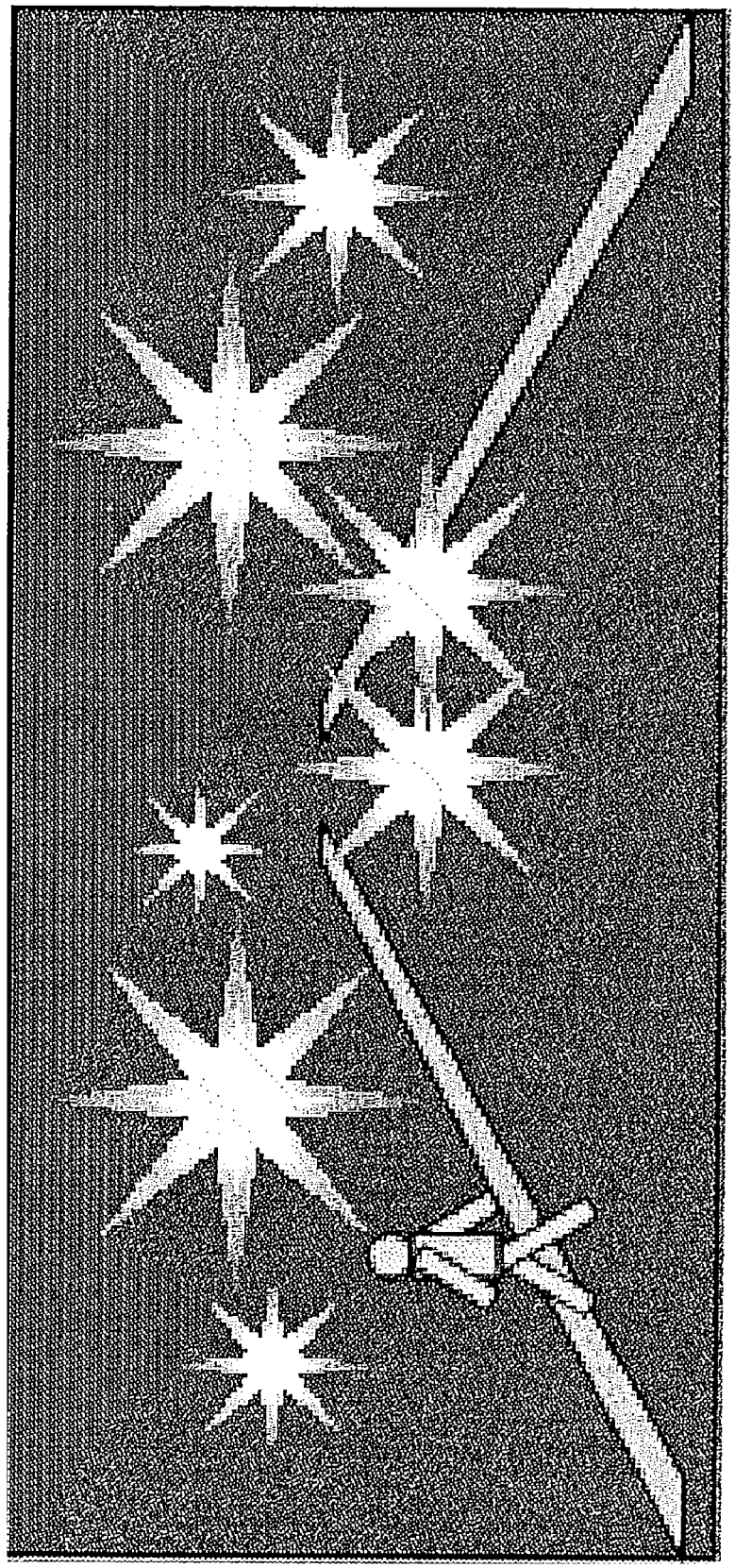
FIG. 7 is a view showing a first image for explaining the first embodiment.
Figure 8:
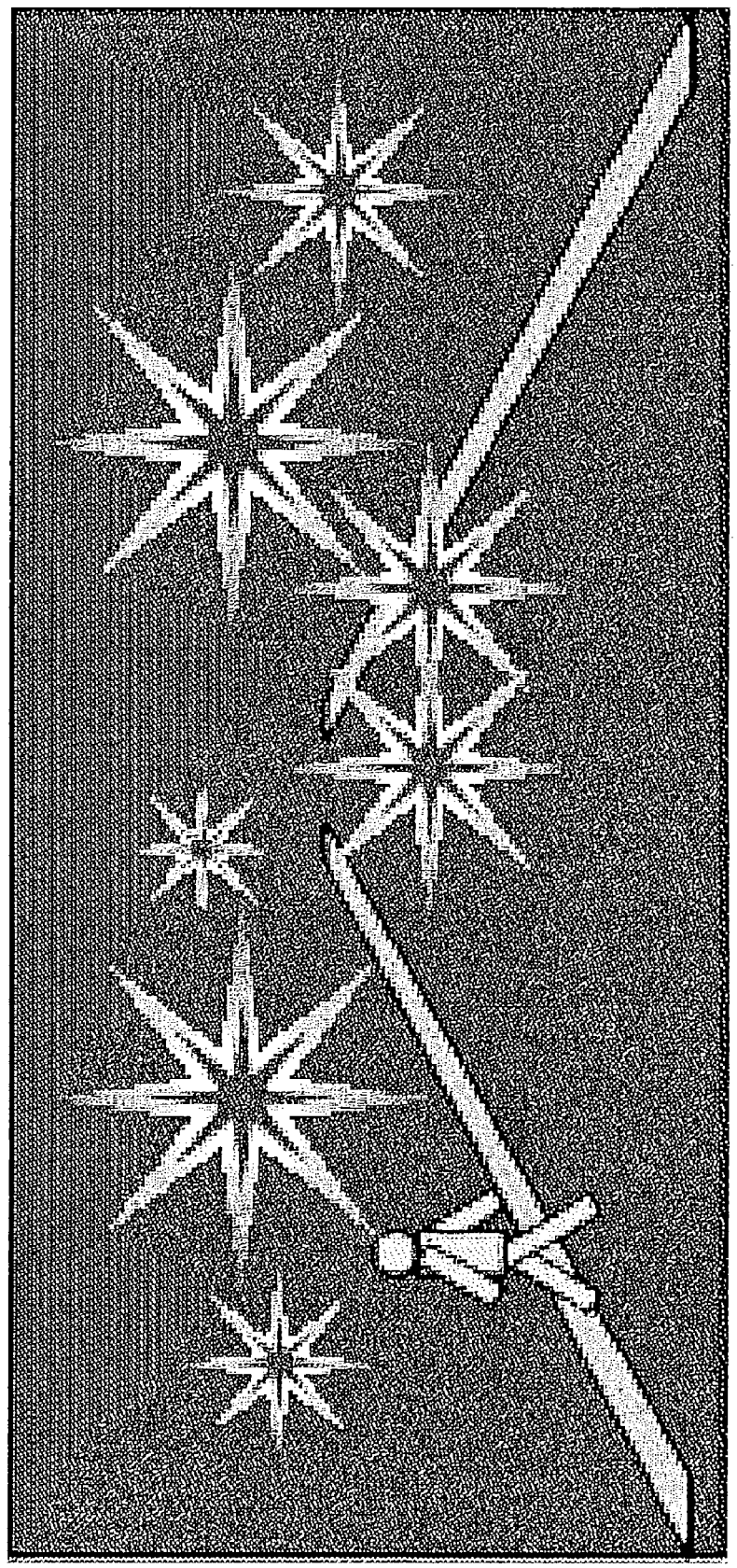
FIG. 8 is a view showing a second image for explaining the first embodiment.
Figure 9:
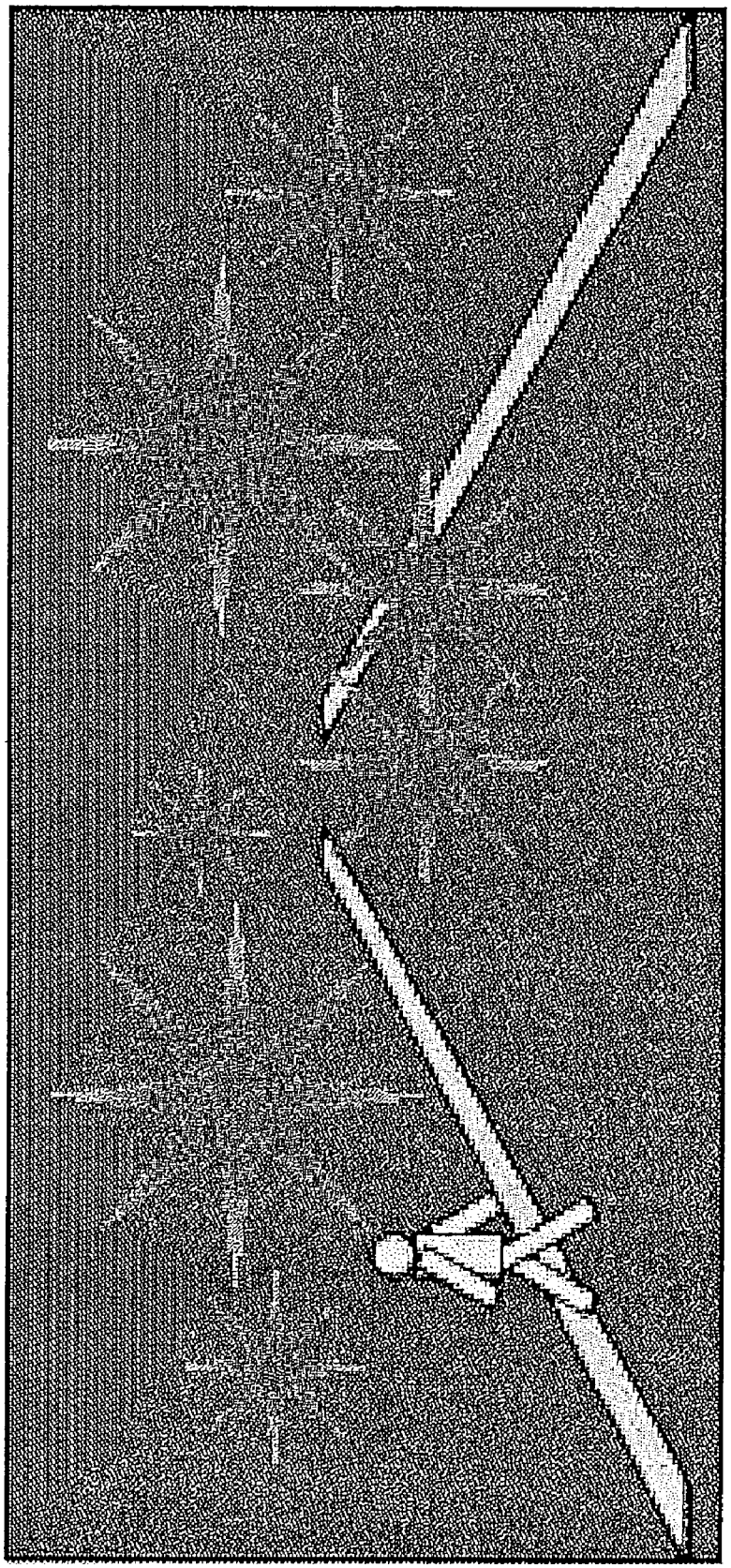
FIG. 9 is a view showing a third image for explaining the first embodiment.

FIG. 6 is a flowchart showing an example of the processing in a first embodiment executed by CPU shown in FIG. 5; FIG. 7 is a view showing a first image for explaining the first embodiment; FIG. 8 is a view showing a second image for explaining the first embodiment; and FIG. 9 is a view showing a third image for explaining the first embodiment.

The ROM 21b of the in-vehicle image correcting device 20 stores the program for causing the μ COM 21 (computer) to operate as an image capturing means for capturing the image picked up by the near-infrared camera 10, a correcting means for correcting the image captured by the image capturing means so that the pixels with a higher density than that of the pixels corresponding to an obstacle (or an obstacle density) have the lower density than that of the latter, a definition means for defining the obstacle density on the basis of the distribution of the densities of the pixels constituting the image captured by the image capturing means, and an adjusting means which when a boundary is detected in which a density difference between adjacent pixels which exceeds a prescribed value for the image corrected by said correcting means, adjusts the density of the pixel with the higher density in the vicinity of the boundary so that it becomes gradually low from the boundary over a prescribed range.

Now referring to the flowchart of FIG. 6, an explanation will be given of an example of the processing executed by the CPU 21a of the in-vehicle image correcting device 20 according to the first embodiment.

When the CPU 21a is started according to an operation by the operation unit 40, in step S10 (image capturing means) the image shown in FIG. 7 picked up by the near-infrared camera 10 is captured in the RAM 21c. Incidentally, as seen from FIG. 7, the image includes a pair of white lines directed to the center and road inside them. On the left side of the image, there is a walker (which corresponds to an obstacle) which is going to cross the road. On the upper side of the image, there are lights of on-coming cars and street lights which has higher brightness at their centers (radial white areas in the figure).

In step S11 (definition means), a histogram of the densities of the pixels constituting the captured image is created. The histogram is divided into two classes with respect to a threshold value. The threshold value is determined so that the two classes are identified most clearly. The threshold value is stored as an obstacle density in the RAM 21c.

In other embodiments, the average value of the densities of all the pixels can be determined as the obstacle density, and the value of 179 which corresponds to about 70% of densities of e.g. 0 to 255.

In step S12, the density of the leading pixel of the captured image is sampled. In step S13, it is determined whether or not the density thus sampled is not lower than the obstacle density. If it is determined that the sampled density is lower that the obstacle density (N in step S13), the processing proceeds to step S15. On the other hand, if it is determined that the sampled density is not lower than the obstacle density (Y in step S13), it is determined that the captured pixel is a light spot. In step S14, its density is changed to zero. Incidentally, when the density is changed, the density has only to be lowered.

In step S15, it is determined whether or not the pixels constituting the entire screen has been processed. If it is determined that the pixels corresponding to the entire screen have not yet been processed (N in step S15) in step S16, the density of a pixel subsequent to the processed pixel is sampled. The processing returns to step S13, and the above series of steps are repeated. If it is determined that the pixels corresponding to the entire screen have been processed (Y in step S15), the processing proceeds to step S17.

When the processing for all the pixels have been completed, as seen from FIG. 8, in the captured image, the central portion of the light spot is dark and its periphery becomes abruptly bright. In this case, in step S17 (correcting means), when a boundary is detected where a density difference between the adjacent pixels exceeds a prescribed value stored in the ROM 21, the density of the pixel with the higher density in the vicinity of the boundary is corrected that it becomes gradually low in a predetermined range from the boundary. Namely, the density of the area in the vicinity of the boundary is shaded off. Thereafter, the processing proceeds to step S18. The above prescribed value is a threshold value for determination which can be optionally.

In step S18, the corrected image is sent to the display device 31 of the HUD 30. The processing returns to step S10 to start a series of processing steps described above for a next image. Thus, the HUD 30 displays the image which has been corrected so that the light spots are darker than the walker (obstacle).

As described above, a series of processing steps in steps S12 to S16 functions as a correcting means. Therefore, the CPU 21a1 in the COM 21 serves as an image capturing means, a correcting means, defining means and adjusting means described in claims.

An explanation will be given of an example of the operation of the night driving view field supporting device according to the first embodiment of this invention described above.

When the image as shown in FIG. 7 is picked up by the near-infrared camera 10, the image is captured into the in-vehicle image correcting device 20. In the in-vehicle correcting device 20, on the basis of the distribution of the densities of the pixels constituting the captured image, the density of the obstacle is defined. If there is a pixel having a higher density than that of the obstacle, the image is corrected so that the density of the pixel becomes lower than that of the obstacle. As shown in FIG. 8, when the boundary where a density difference between the adjacent pixels exceeds a prescribed value is detected in the corrected image, the image is corrected so that the pixel having the higher density in the vicinity of the boundary has the lower density. Subsequently, as shown in FIG. 9, the image corrected so that the portions of the light spots are darker than the walker (obstacle) is displayed on the HUD 30.

As described above, if the image picked up by the near-infrared camera 10 includes the pixel having the higher density than that of the pixel, (obstacle density) corresponding to the obstacle, the image is corrected so that the density of the former becomes lower than the obstacle density. For this reason, the image picked up by the near-infrared camera 10 can be made from which the obstacle can be easily recognized. Accordingly, even the object having a higher brightness than that of the obstacle such as the headlight of an on-coming car, street light, etc is picked up by the near-infrared camera 10, the image displays the obstacle clearly so that the obstacle can be easily recognized.

Since the obstacle density is defined on the basis of the histogram (distribution) of the densities of the pixels which constitute the captured image, the obstacle density suitable to the captured image can be automatically calculated. Further, when the boundary where a density difference between the adjacent pixels is detected, the density of the pixel with the higher density in the vicinity of the boundary is corrected to the lower density. By this correction, the image can be created in which an abrupt change in the density between the adjacent pixels does not appear.

Accordingly, on the HUD 30, since the obstacle is displayed more clearly than the street light, the headlight of the on-coming car which give a large quantity of light, the driver can visually recognize the obstacle surely. Thus, a night driving view field supporting device can be provided which can more surely support the driving view field of the driver at night.

Embodiment 2

Figures 1, 3:
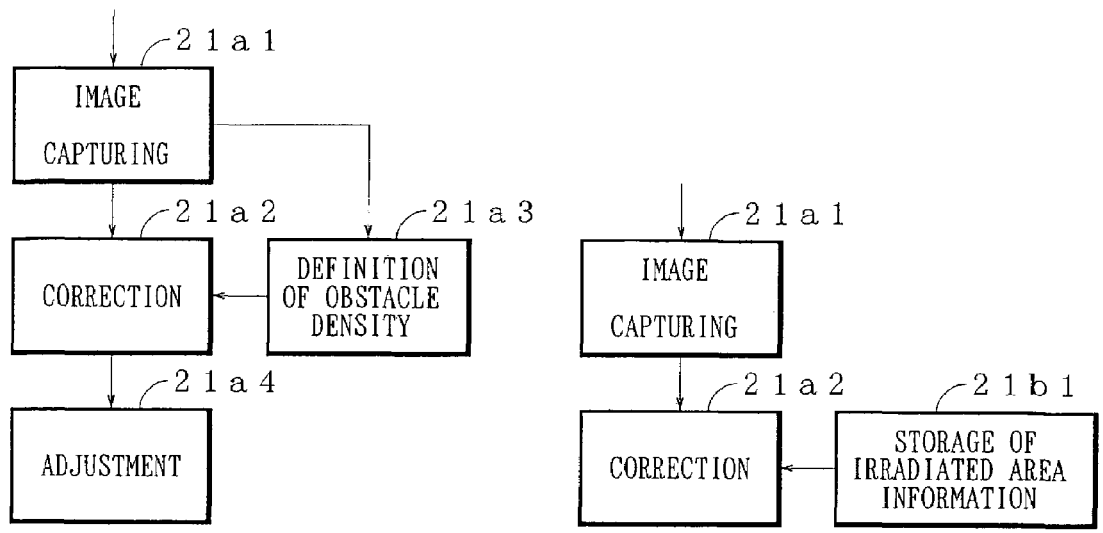
FIG. 1 is a first arrangement view showing the basic arrangement of an in-vehicle image correcting device.
FIG. 3 is a third arrangement view showing the basic arrangement of an in-vehicle image correcting device.
Figure 2:
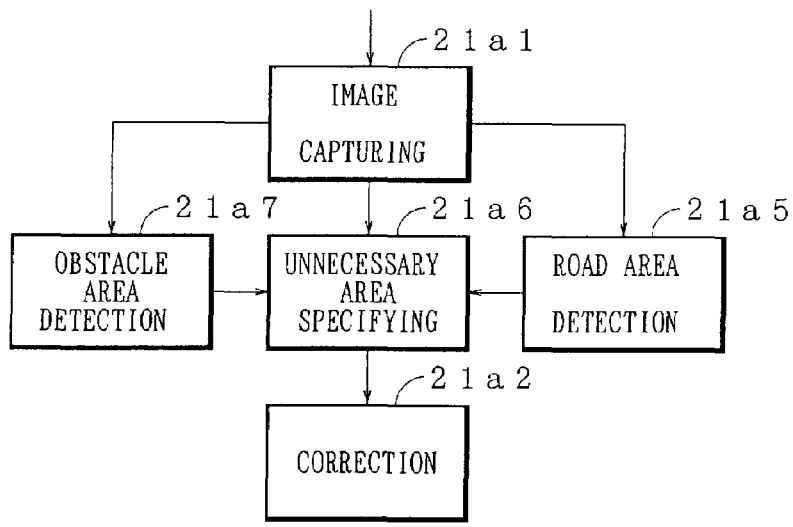
FIG. 2 is a second arrangement view showing the basic arrangement of an in-vehicle image correcting device.
Figure 4:
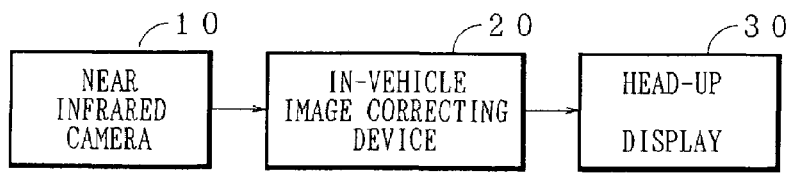
FIG. 4 is an arrangement view showing the basic arrangement of a night driving view field supporting device according to this invention.
Figure 10:
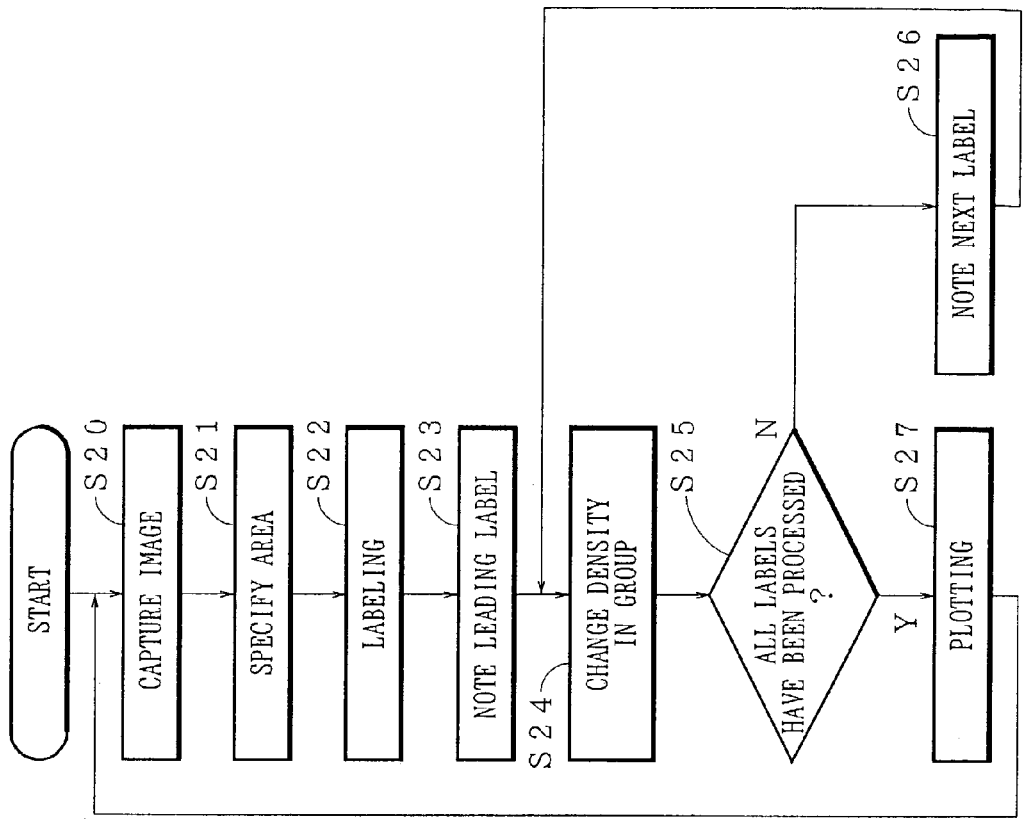
FIG. 10 is a flow chart showing an example of the processing in a second embodiment executed by CPU shown in FIG. 5.
Figure 11:
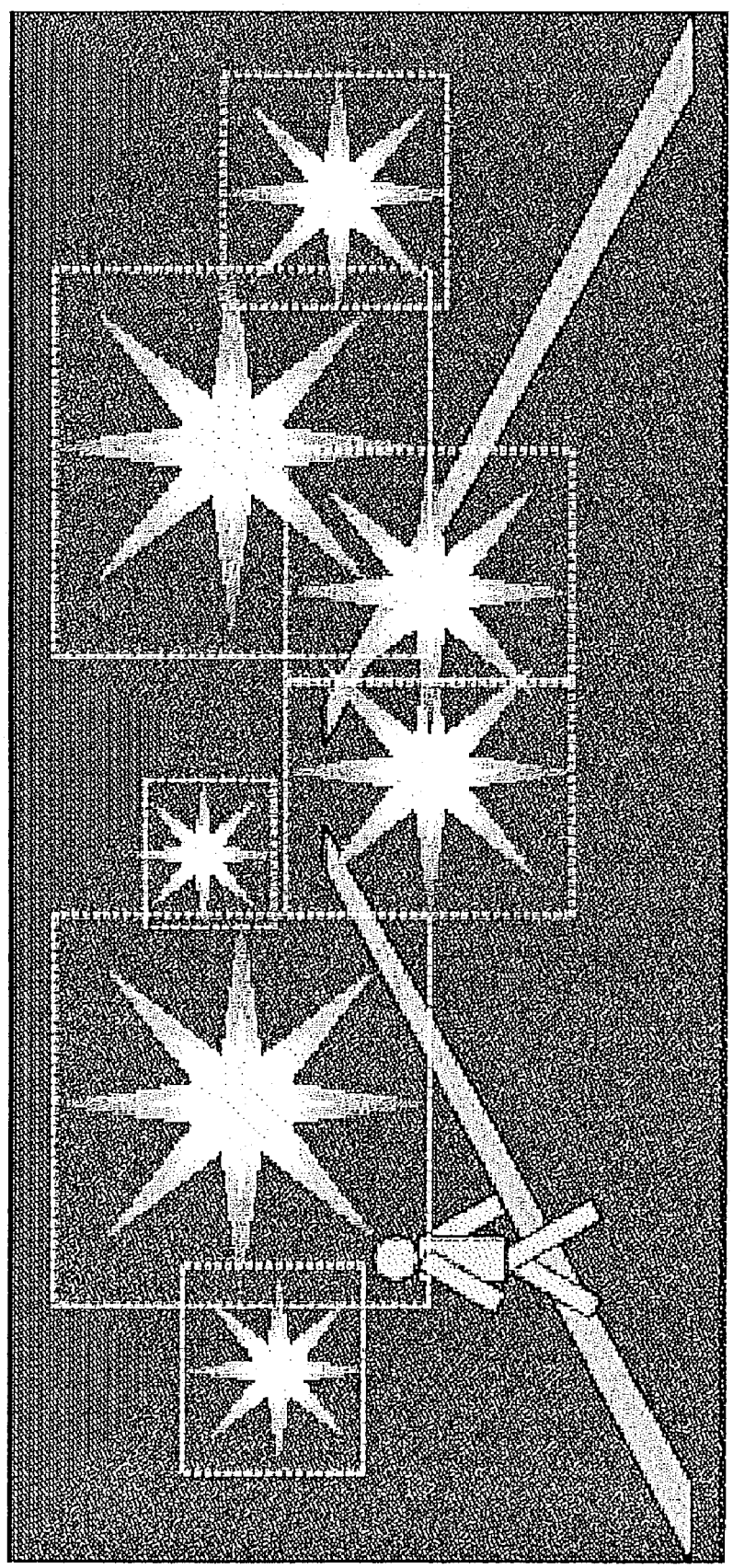
FIG. 11 is a view showing a fourth image for explaining the second embodiment.
Figure 12:
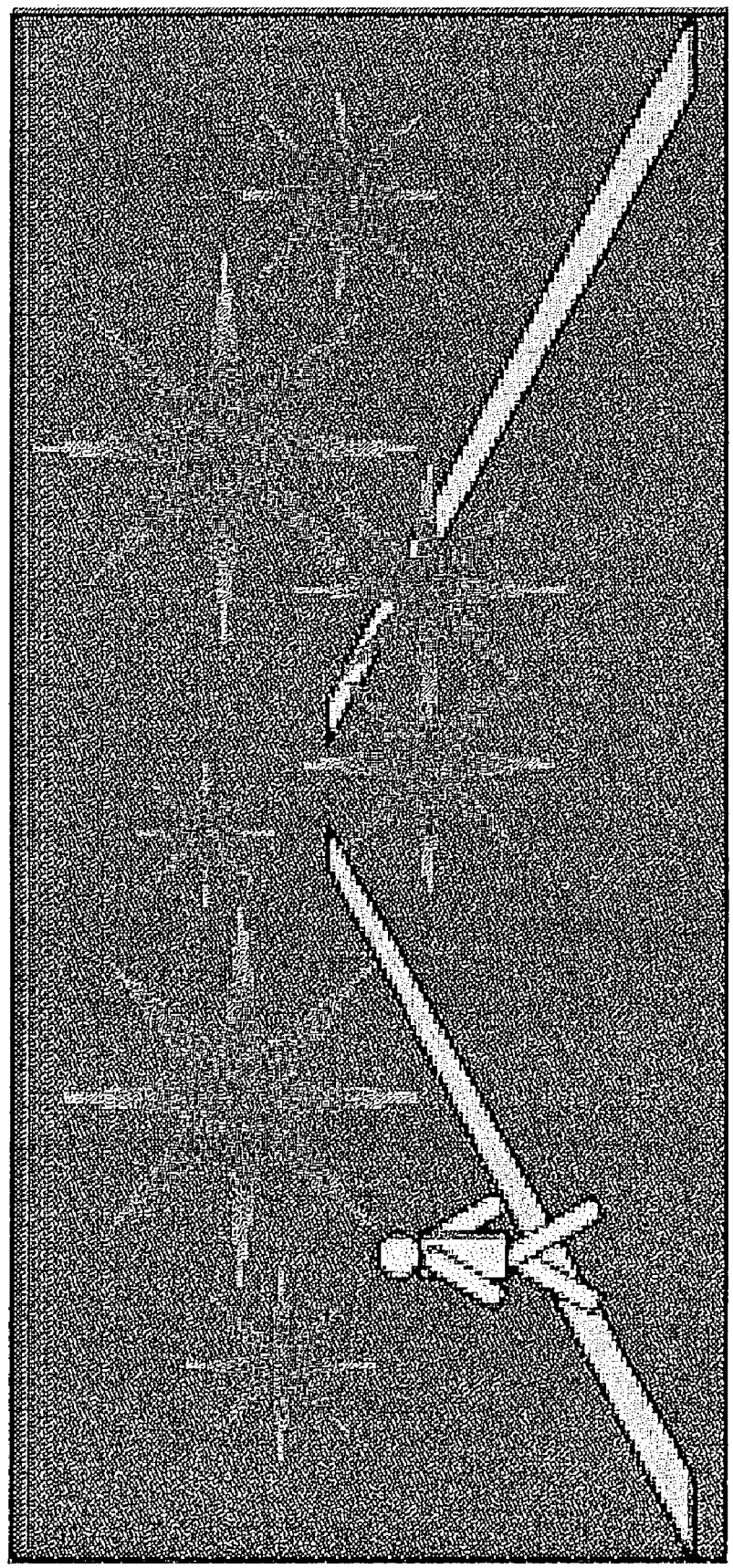
FIG. 12 is a view showing a fifth image for explaining the second embodiment.

FIG. 10 is a flowchart showing an example of the processing in a second embodiment executed by CPU shown in FIG. 5; FIG. 11 is a view showing a fourth image for explaining the second embodiment; and FIG. 12 is a view showing a fifth image for explaining the second embodiment.

The ROM 21b of the in-vehicle image correcting device 20 stores the program for causing the μ COM 21 (computer) to operate as an image capturing means for capturing the image picked up by the near-infrared camera 10, and a correcting means for correcting the image captured by the image capturing means so that the pixels with a higher density than that of the pixel corresponding to an obstacle (or an obstacle density) have the lower density than that of the latter.

The above correcting means causes the μCOM 21 (computer) to define, in the image captured by the image capturing means, the area in which the pixel density becomes radially low and to execute the above correction for the defined area.

Now referring to the flowchart of FIG. 10, an explanation will be given of an example of the processing executed by the CPU 21a of the in-vehicle image correcting device 20 according to the second embodiment.

When the CPU 21a is started according to an operation by the operation unit 40, in step S20 (image capturing means) the image shown in FIG. 7 picked up by the near-infrared camera 10 is captured in the RAM 21c. Incidentally, as seen from FIG. 7, the image includes a pair of white lines directed to the center and road inside them. On the left side of the image, there is a walker (which corresponds to an obstacle) which is going to cross the road. On the upper side of the image, there are light of on-coming cars and street lights which has higher brightness at their centers (radial white areas in the figure).

The direct light such as the headlight of the on-coming car and street light has a radial light distribution in which the density (brightness) is high at the center and gradually attenuates at a position farther in the respective directions from the center. Therefore, in step S21, areas in each of which the pixel density becomes low, i.e. areas each of which encircles a light spot by a broken line in FIG. 11 are defined from the captured image. In step S22, labeling is made for sequentially applying labels to the defined areas from e.g. the left side in FIG. 11.

In step S23, the area corresponding to a leading label is noted. In step S24, the densities of all the pixels of the noted area are corrected successively from the leading pixel so that they are not higher than a prescribed obstacle density in the ROM 21.

In step S25, it is determined whether or not the processing for the areas corresponding to all the labels has been executed. If it is determined that all the labels have not been yet processed (step S25), in step S26, the area corresponding to the label subsequent to the processed label is noted. The processing returns to step S24 and a series of processing steps are repeated.

If it is determined in step S25 that all the labels have been processed (Y in step S25), in step S27, the corrected image is sent to the display device 31 of the HUD 30 through the interface 22. Thereafter, the processing returns to step S20, and a series of processing steps are repeated for a next image. Thus, on the HUD 30, as shown in FIG. 12, the image is displayed in which the light spots in the areas subjected to the labeling are darker than the walker (obstacle).

As described above, a series of processing steps in steps S21 to S26 functions as the correcting means. Therefore, the CPU 21a1 of the μCOM 21 serves as an image capturing means and correcting means described in claims.

Like the first embodiment, where the central portion of the light spot is dark and its periphery becomes abruptly bright, step S17 in FIG. 6 may be added prior to step S27.

An explanation will be given of an example of the operation of the night driving view field supporting device according to the second embodiment of this invention described above.

When the image as shown in FIG. 7 is picked up by the near-infrared camera 10, the image is captured into the in-vehicle image correcting device 20. The areas in each of which encircles a light spot by a broken line in FIG. 11 are defined from the captured image. The labeling is made for the respective areas. The image is corrected so that the density of each pixel in each area is not higher than a prescribed obstacle density in the ROM 21b. As a result, as shown in FIG. 12, as shown in FIG. 12, the image is displayed in which the light spots in the areas subjected to the labeling are darker than the walker (obstacle).

As described above, if the image picked up by the near-infrared camera 10 includes the pixel having the higher density than that of the pixel (obstacle density) corresponding to the obstacle, the image is corrected so that the density of the former becomes lower than the obstacle density. For this reason, the image picked up by the near-infrared camera 10 can be made from which the obstacle can be easily recognized. Accordingly, even the object having a higher brightness than that of the obstacle such as the headlight of an on-coming car, street light, etc. is picked up by the near-infrared camera 10, the image displays the obstacle clearly so that the obstacle can be easily recognized.

Further, the areas in each of which the pixel density becomes radially low, i.e. areas with the displayed headlight, street light, etc. are defined in the image, and the correction for the areas is made. For this reason, the objects other than the obstacle can be excluded from the image and be made inconspicuous. Thus, since the captured image is corrected into an image from which only the obstacle can be visually recognized, the obstacle can be recognized more surely.

Accordingly, on the HUD 30, since the obstacle is displayed more clearly than the street light, the headlight of the on-coming car which give a large quantity of light, the driver can visually recognize the obstacle surely. Thus, a night driving view field supporting device can be provided which can more surely support the driving view field of the driver at night.

Embodiment 3

Figure 13:
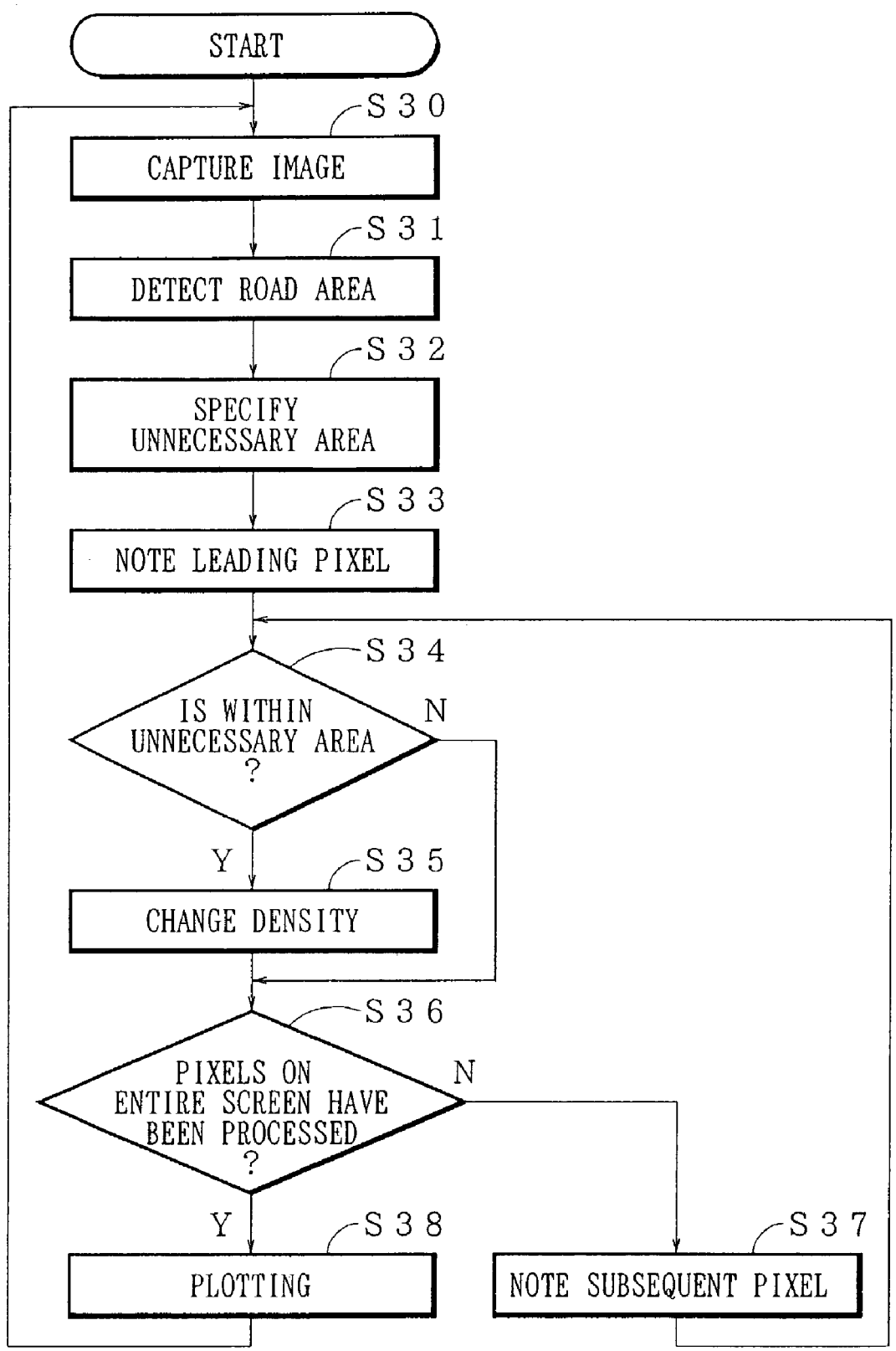
FIG. 13 is a flowchart showing an example of the processing in a third embodiment executed by CPU shown in FIG. 5.
Figure 14:
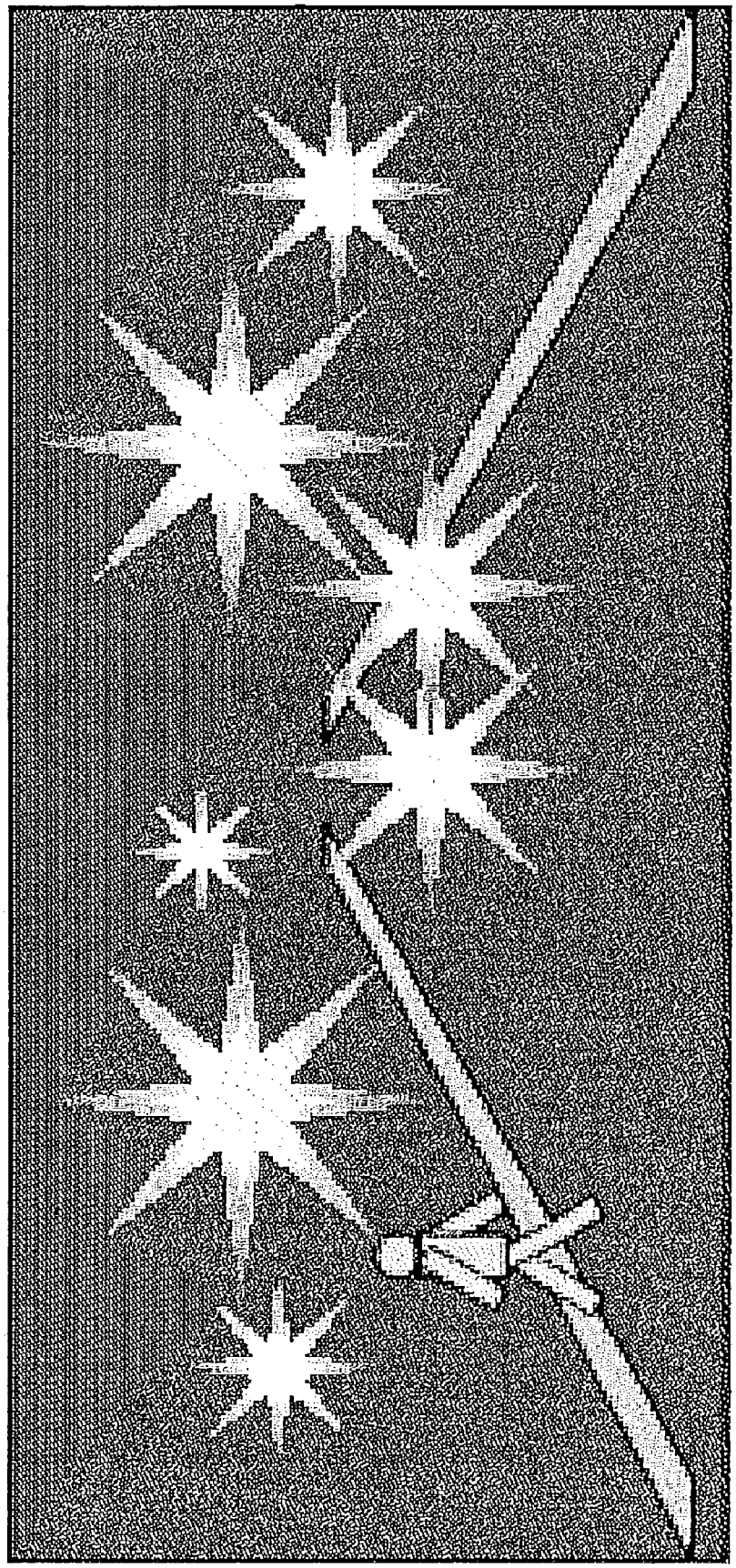
FIG. 14 is a view showing a sixth image for explaining the third embodiment.
Figure 15:
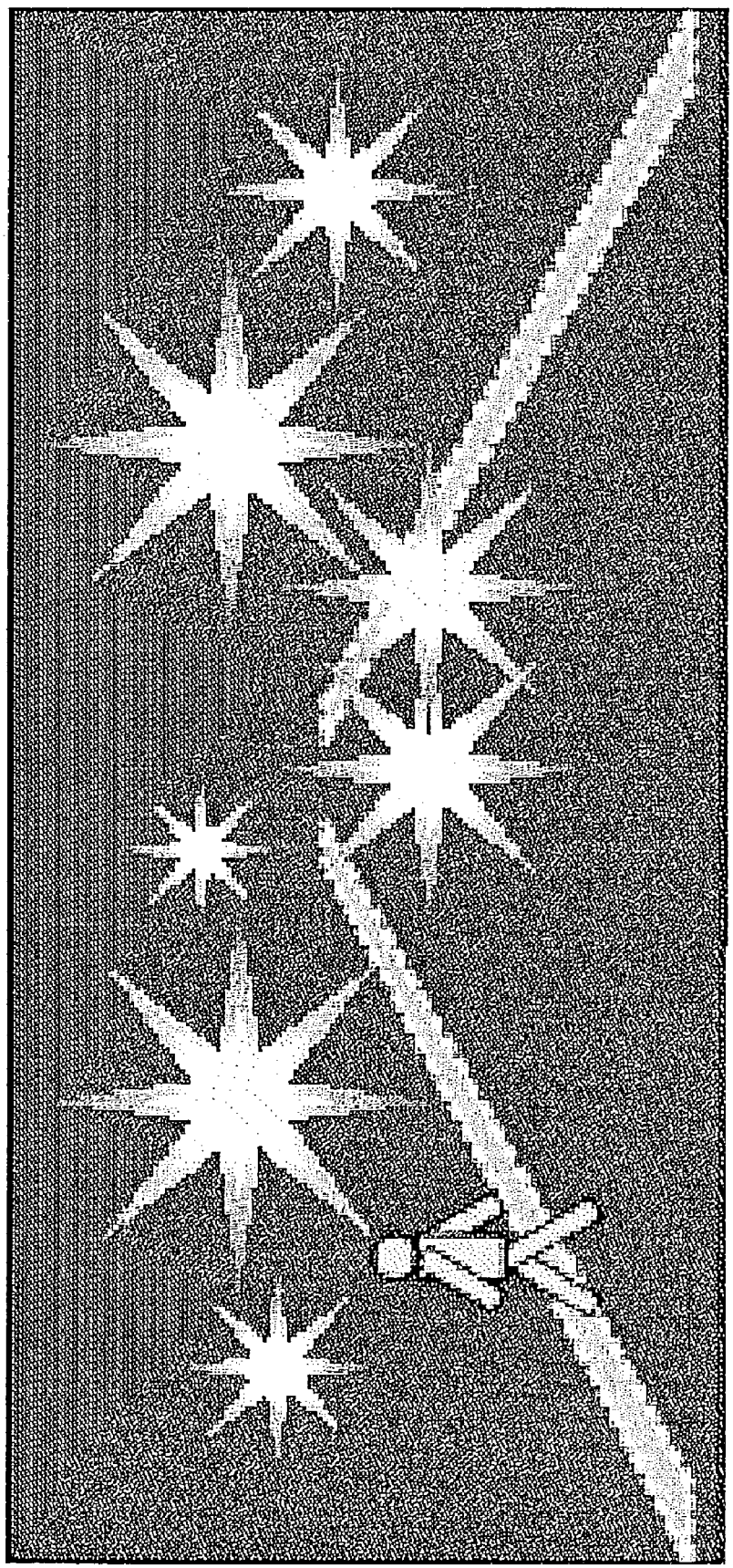
FIG. 15 is a view showing a seventh image for explaining the third embodiment.
Figure 16:
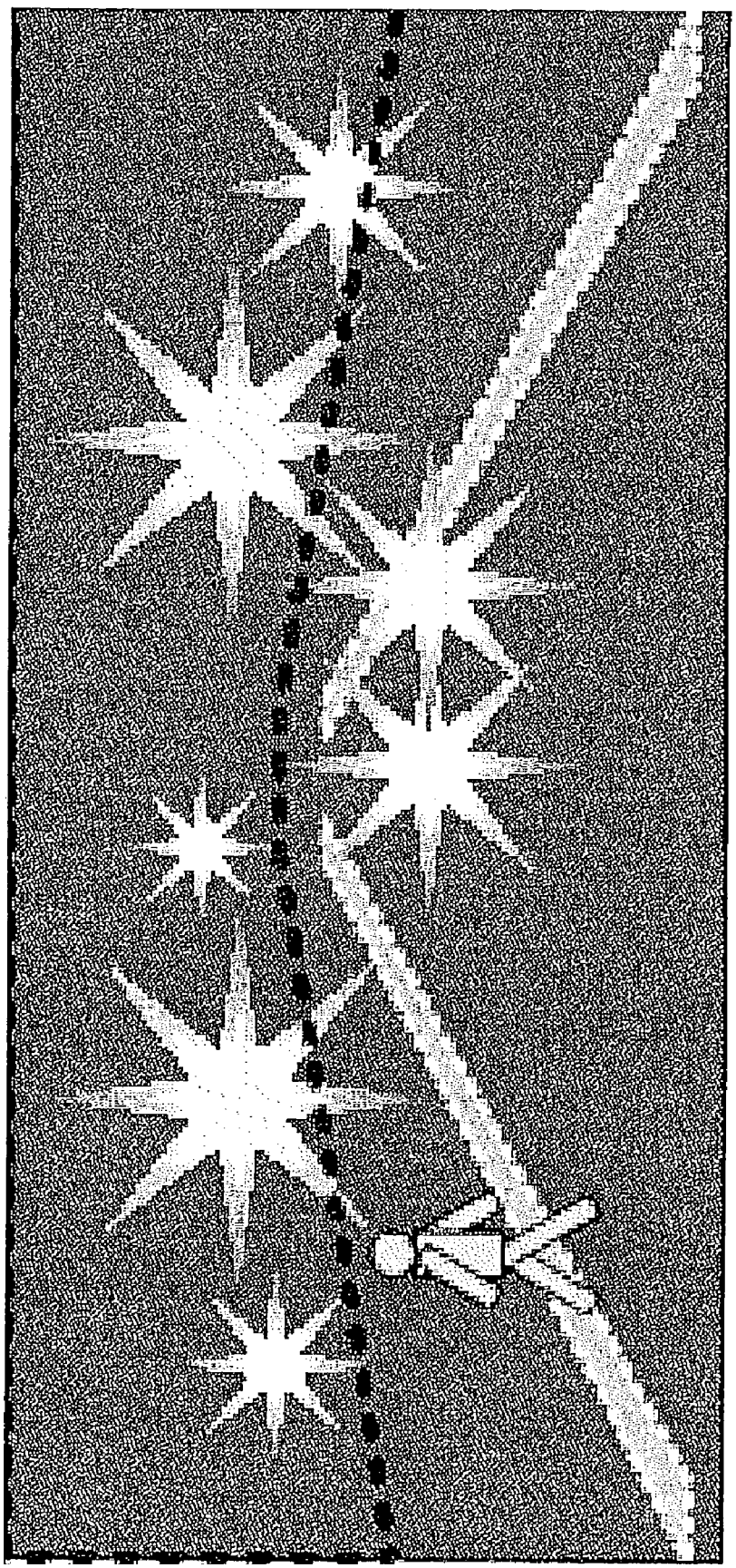
FIG. 16 is a view showing an eighth image for explaining the third embodiment.
Figure 17:
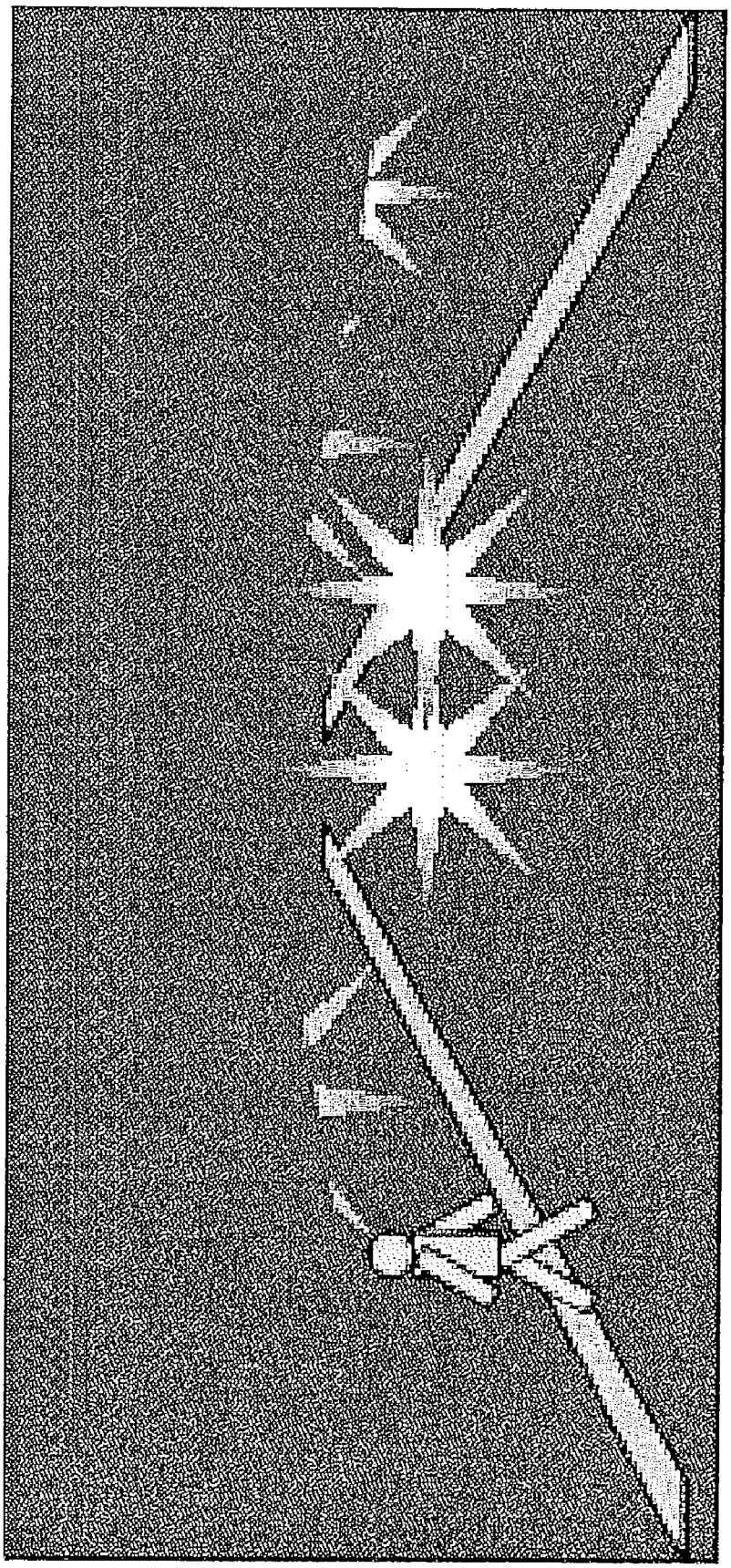
FIG. 17 is a view showing an ninth image for explaining the third embodiment.

FIG. 13 is a flowchart showing an example of the processing in a third embodiment executed by CPU shown in FIG. 5; FIG. 14 is a view showing a sixth image for explaining the third embodiment; FIG. 15 is a view showing a seventh image for explaining the third embodiment; FIG. 16 is a view showing an eighth image for explaining the third embodiment; and FIG. 17 is a view showing an ninth image for explaining the third embodiment.

The ROM 21*b* of the in-vehicle image correcting device 20 stores the program for causing the μ COM 21 (computer) to operate as an image capturing means for capturing the image picked up by the near-infrared camera 10, a road area detecting means for detecting a road area representative of a road on the image captured by the image capturing means, an unnecessary area specifying means for specifying an unnecessary area of the image which may not be visually recognized by the driver; a correcting means for correcting the image captured by the image capturing means so that the pixels corresponding to the unnecessary area specified by said unnecessary area specifying means have a density lower than that of the pixel corresponding to an obstacle (or an obstacle density).

Now referring to the flowchart of FIG. 13, an explanation will be given of an example of the processing executed by the CPU 21*a* of the in-vehicle image correcting device 20 according to the third embodiment.

When the CPU 21*a* is started according to an operation by the operation unit 40, in step S30 (image capturing means), the image shown in FIG. 14 picked up by the near-infrared camera 10 is captured in the RAM 21*c*. Incidentally, as seen from FIG. 14, the image includes a pair of white lines directed to the center and road inside them. On the left side of the image, there is a walker (which corresponds to an obstacle) which is going to cross the road. On the upper side of the image, there are light of on-coming cars and street lights which has higher brightness at their centers (radial white areas in the figure).

In step S31 (road area detecting means), the white lines, road shoulders, etc. (corresponding to white broken lines) on the image shown in FIG. 15 are detected and the area sandwiched between the white lines, road shoulders is detected as a road area representative of a road. In step S32 (unnecessary area specifying means), the area which exceeds the height of 2 meter from e.g. the road area and white lines, road shoulders, etc., area encircled by black broken line in the image shown in FIG. 16 is defined as an unnecessary area of the image which may not be visually recognized by the driver.

In step S33, the leading pixel of the captured image is noted and its density is extracted. In step S34, it is determined whether or not the noted pixel is located within the unnecessary area. If it is determined that the pixel is not located within the unnecessary area (N in step S34), the processing proceeds to step S36. On the other hand, if it is determined that the noted pixel is located within the unnecessary area (Y in step S34), the processing proceeds step S35.

In step S35, the density of the pixel is changed so that it is not higher than the obstacle density prescribed in e.g. the ROM 21*b*. Thereafter, in step S36, it is determined whether or not the pixels constituting the entire screen has been processed. If it is determined that the pixels corresponding to the screen have not yet been processed (N in step S36), in step S17, the density of a pixel subsequent to the processed pixel is sampled. The processing returns to step S34, and the above series of steps are repeated. If it is determined that the pixels corresponding to the entire screen have been processed (Y in step S36), the processing proceeds to step S38.

In step S38, the corrected image is sent to the display device 31 of the HUD 30 through the interface 22. Thereafter, the processing returns to step S30, and a series of processing steps are repeated for a next image. Thus, on the HUD 30, as shown in FIG. 17, the image is displayed in which the light spots above the walker (obstacle) (upper half part of the screen) are excluded and the light spots corresponding to the headlights of the oncoming cars and a part of the light spot corresponding to the streetlights remain.

As described above, the series of processing steps S37 to S37 function as the correcting means. Therefore, the CPU 21*a*1 of μCOM 21 serves as the image capturing mean, road area detecting means, unnecessary area specifying means, and correcting means.

An explanation will be given of an example of the operation of the night driving view field supporting device according to the third embodiment of this invention described above.

When the image as shown in FIG. 14 is picked up by the near-infrared camera 10, the image is captured into the in-vehicle image correcting device 20. In the in-vehicle correcting device 20, the white lines, road shoulders, etc. on the captured image (corresponding to white broken lines in FIG. 15) are detected and the area sandwiched between the white lines, road shoulders is detected as a road area. These road area and area which exceeds the height of 2 meter from e.g. the road area and white lines, road shoulders, etc. (encircled by black broken line in the image shown in FIG. 16) are specified as an unnecessary area of the image which-may not be visually recognized by the driver. The specified unnecessary area of the image is corrected in such a manner that the density of the pixel is not higher than the obstacle density prescribed in e.g. the ROM 21*b*. Thus, on the HUD 30, the image as shown in FIG. 17 is displayed in which the light spots above the walker (obstacle) (upper half part of the screen) are excluded and the light spots corresponding to the headlights of the oncoming cars and a part of the light spot corresponding to the streetlights remain.

As described above, the road area is specified from the image picked up by the near-infrared camera 10; on the basis of the specified road area, the unnecessary area of the image which may not be visually recognized by the driver is specified; and the specified unnecessary area of the image is corrected in such a manner that the density of the pixel is not higher than the obstacle density. For this reason, the image picked up by the near-infrared camera 10 can be made which permits the obstacle to be easily recognized. Further, since the street lights are commonly displayed in the upper part of the screen, by specifying the unnecessary area above the road area, the objects which impedes the visual recognition can be excluded or made inconspicuous. Thus, even when the street lights along the road and others which have higher luminance than the obstacle are picked up by the near-infrared camera 10, the image clearly shows the obstacle so that the obstacle can be easily recognized.

Accordingly, on the HUD 30, since the obstacle is displayed more clearly than the street light, the headlight of the on-coming car which give a large quantity of light, the driver can visually recognize the obstacle surely. Thus, a night driving view field supporting device can be provided which can more surely support the driving view field of the driver at night.

Embodiment 4

Figure 18:
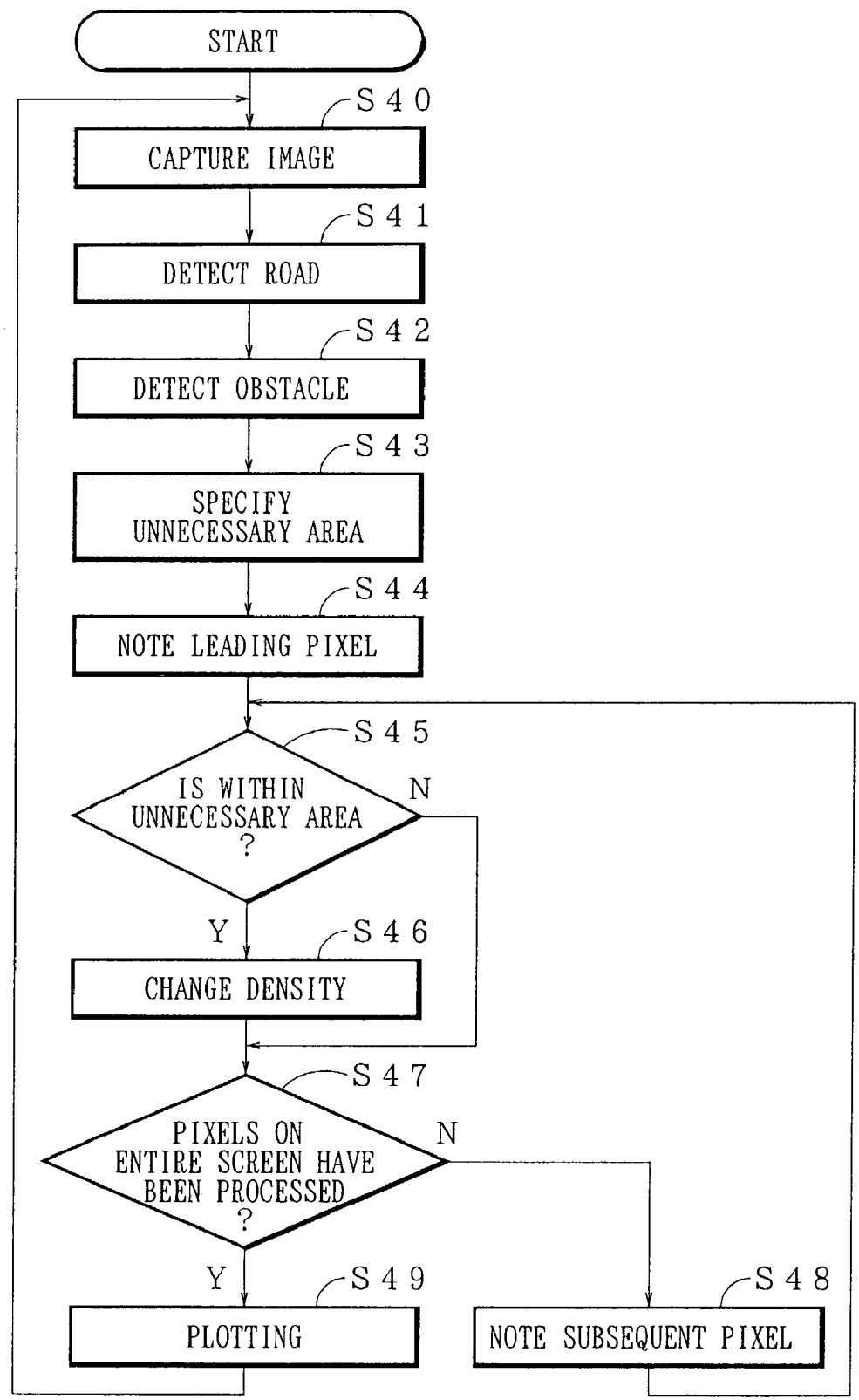
FIG. 18 is a flowchart showing an example of the processing in a fourth embodiment executed by CPU shown in FIG. 5.
Figure 19:
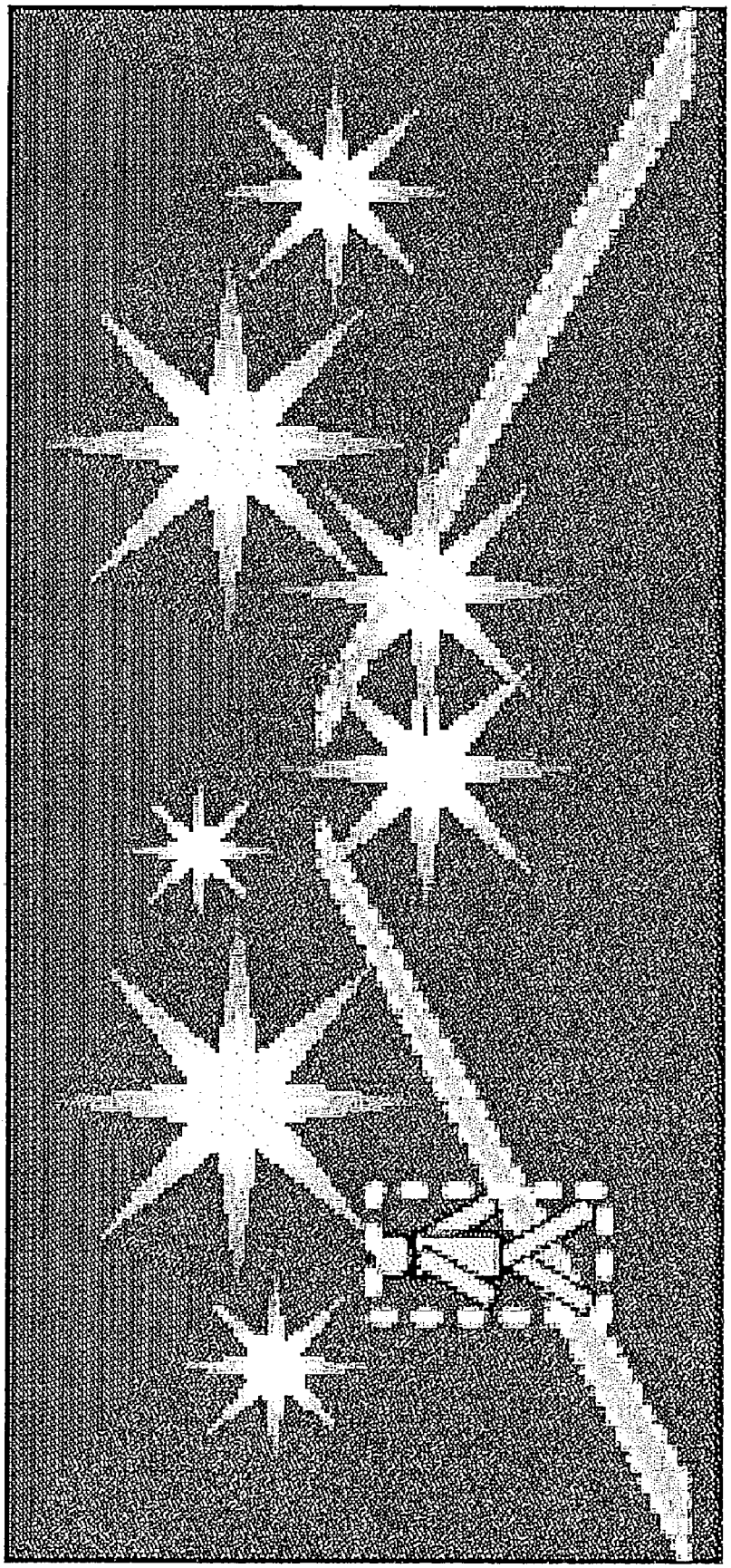
FIG. 19 is a view showing a tenth image for explaining the fourth embodiment.
Figure 20:
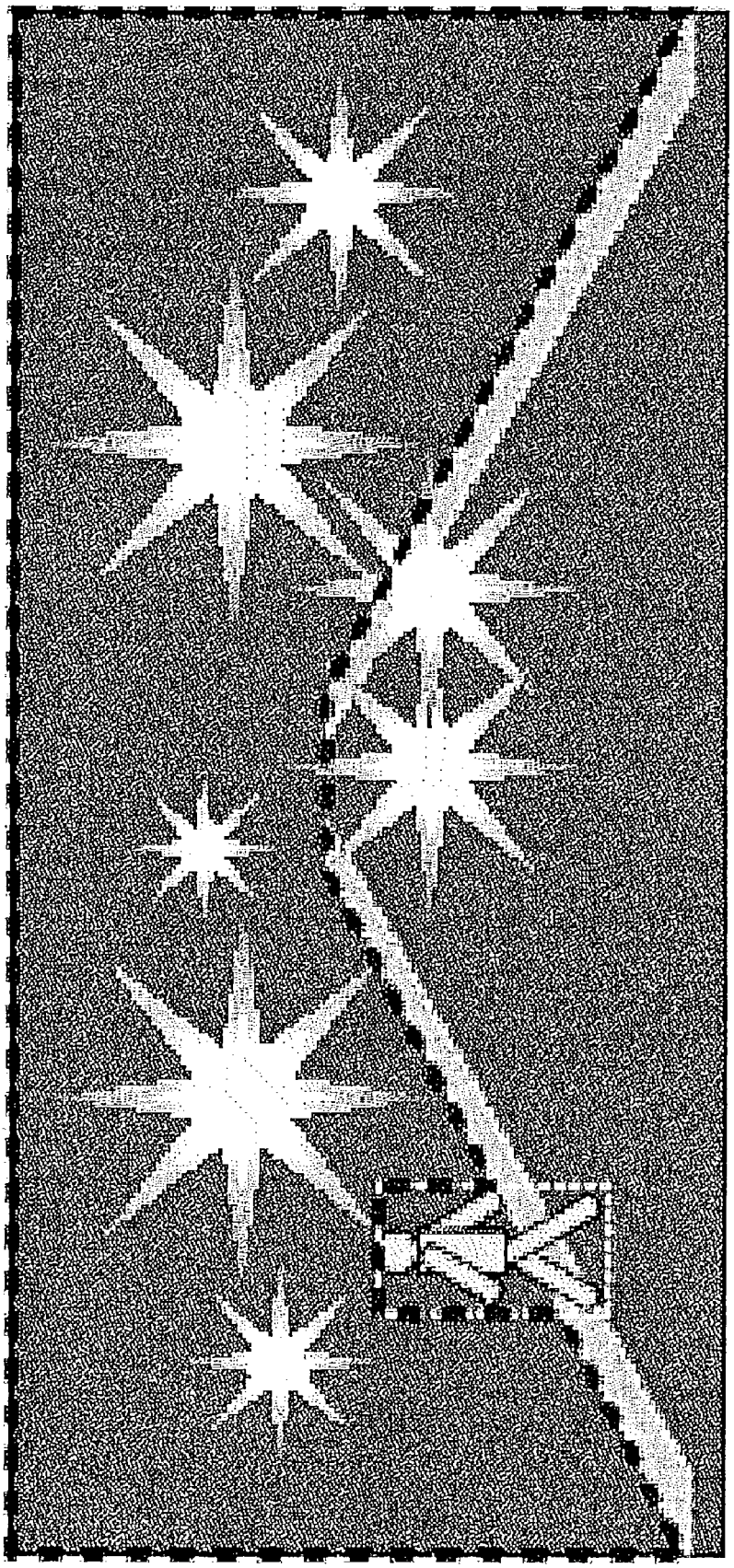
FIG. 20 is a view showing an eleventh image for explaining the fourth embodiment.
Figure 21:
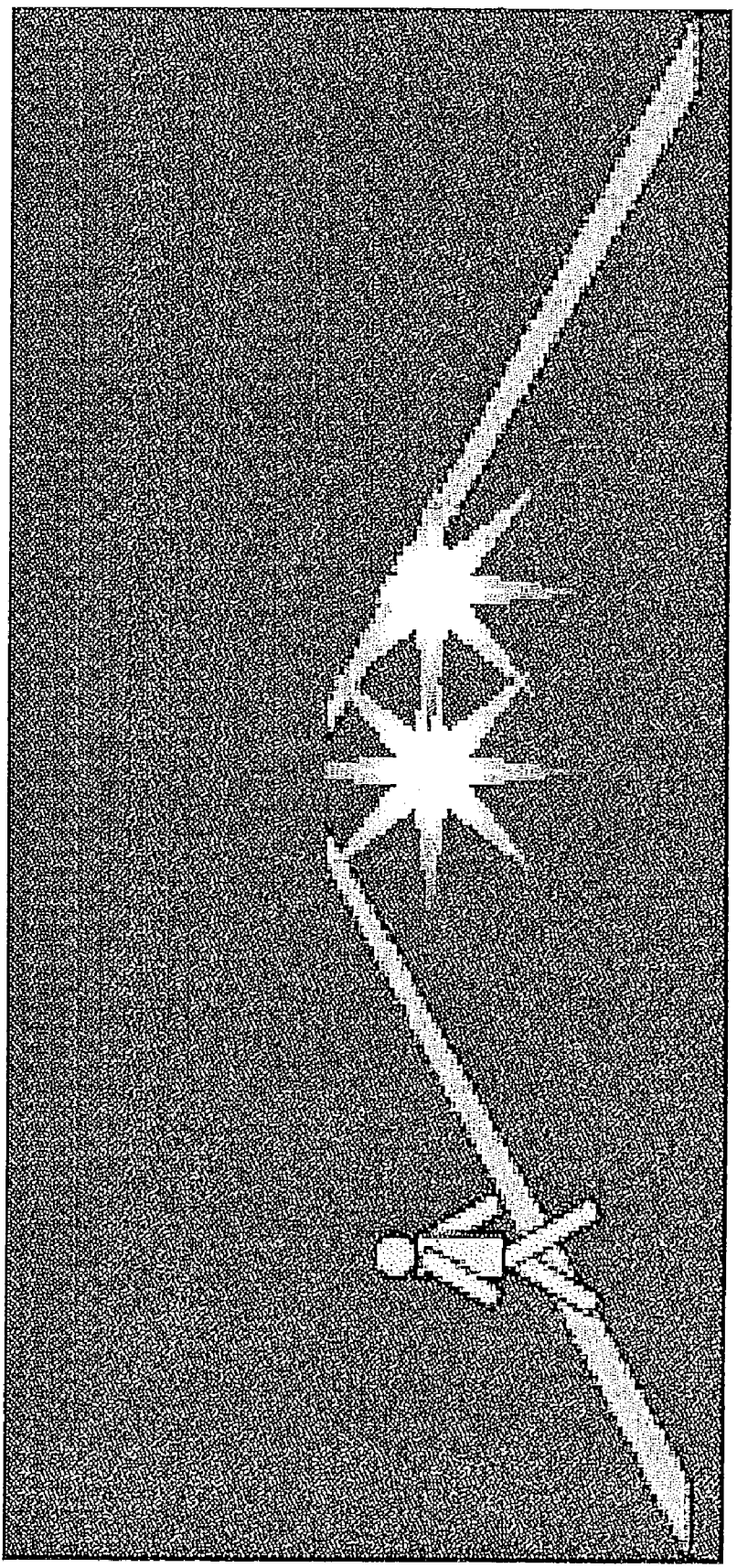
FIG. 21 is a view showing a twelfth-image for explaining the fourth embodiment.

FIG. 18 is a flowchart showing an example of the processing in a fourth embodiment executed by CPU shown in FIG. 5; FIG. 19 is a view showing a tenth image for explaining the fourth embodiment; FIG. 20 is a view showing an eleventh image for explaining the fourth embodiment; and FIG. 21 is a view showing a twelfth image for explaining the fourth embodiment.

The ROM 21b of the in-vehicle image correcting device 20 stores the program for causing the μ COM 21 (computer) to operate as the image capturing means, road area detecting means, unnecessary area specifying means and correcting means, which have been explained in the third embodiment, and further as an obstacle area detecting means for detecting the obstacle area corresponding to the obstacle on the image captured by the image capturing means and the unnecessary area specifying means which performs a specifying operation on the basis of the obstacle area detected by the above obstacle area detecting means 21a7.

Now referring to the flowchart of FIG. 18, an explanation will be given of an example of the processing executed by the CPU 21a of the in-vehicle image correcting device 20 according to the fourth embodiment.

When the CPU 21a is started according to an operation by the operation unit 40, in step S40 (image capturing means), as in the third embodiment, the image shown in FIG. 14 picked up by the near-infrared camera 10 is captured in the RAM 21c. Thereafter, in step S41 (road area detecting means), the white lines, road shoulders, etc. (corresponding to white broken lines) on the image shown in FIG. 15 are detected and the area sandwiched between the white lines, road shoulders is detected as a road area representative of a road.

In step S42 (obstacle area detecting means), the walker (corresponding to the obstacle) on the image shown in FIG. 19 is detected on the basis of the obstacle density prescribed in e.g. the ROM 21b, and the area encircling the detected walker (corresponding to white broken line) is detected as an obstacle area corresponding to the obstacle.

In step S43 (unnecessary area specifying means), on the basis of the detected road area and obstacle area, the upper area other than these areas on the image, i.e. the area encircled by black broken line on the image shown in FIG. 20 is specified as an unnecessary area which may not be visually recognized by the driver.

In step S44, the leading pixel in the captured image is noted and its density is detected. In step S45, it is determined whether or not the pixel is located within the unnecessary area. If it is determined that the pixel is not located within the unnecessary area (N in step S45), the processing proceeds to step S47. On the other hand, if it is determined that pixel is located within the unnecessary area (Y in step S45), the processing proceeds to step S46.

In step S46, the density of the pixel is changed so that it is not higher than the obstacle density prescribed in e.g. the ROM 21b. Thereafter, in step S47, it is determined whether or not the pixels constituting the entire screen has been processed. If it is determined that the pixels corresponding to the screen have not yet been processed (N in step S47), in step S48, the density of a pixel subsequent to the processed pixel is sampled. The processing returns to step S45, and the above series of steps are repeated. If it is determined that the pixels corresponding to the entire screen have been processed (Y in step S47), the processing proceeds to step S49.

In step S49, the corrected image is sent to the display device 31 of the HUD 30 through the interface 22. Thereafter, the processing returns to step S40, and a series of processing steps are repeated for a next image. Thus, on the HUD 30, as shown in FIG. 21, the image is displayed in which the light spots above the walker (obstacle) (upper half part of the screen) are excluded and the light spots corresponding to the headlights of the oncoming cars remain.

As described above, the series of processing steps S44 to S48 function as the correcting means. Therefore, the CPU 21a 1 of μCOM 21 serves as the image capturing mean, road area detecting means, unnecessary area specifying means, correcting means and obstacle area detecting means.

An explanation will be given of an example of the operation of the night driving view field supporting device according to the fourth embodiment of this invention described above.

When the image as shown in FIG. 14 is picked up by the near-infrared camera 10, the image is captured into the in-vehicle image correcting device 20. In the in-vehicle correcting device 20, the white lines, road shoulders, etc. on the captured image (corresponding to white broken lines in FIG. 15) are detected, and the area encircling the walker on the image (corresponding to the white broken line in FIG. 19) is detected as an obstacle area-corresponding to the obstacle.

On the basis of the detected road area and obstacle area, the upper area other than the road area and obstacle area on the image, i.e. the area encircled by black broken line on the image shown in FIG. 20 is specified as an unnecessary area which may not be visually recognized by the driver. Further, the specified unnecessary area of the image is corrected in such a manner that the density of the pixel is not higher than the obstacle density prescribed in, e.g. the ROM 21b. Thus, on the HUD 30, the image as shown in FIG. 21 is displayed in which the light spots above the walker (obstacle) are excluded and the light spots corresponding to the headlights of the oncoming cars remain.

As described above, the road area is specified from the image picked up by the near-infrared camera 10; on the basis of the specified road area, the unnecessary area of the image which may not be visually recognized by the driver is specified; and the specified unnecessary area of the image is corrected in such a manner that the density of the pixel is not higher than the obstacle density. For this reason, the image picked up by the near-infrared camera 10 can be made which permits the obstacle to be easily recognized. Further, since the street lights are commonly displayed in the upper part of the screen, by specifying the unnecessary area above the road area, the objects which impedes the visual recognition can be excluded or made inconspicuous. Thus, even when the street lights along the road and others which have higher luminance than the obstacle are picked up by the near-infrared camera 10, the image clearly shows the obstacle so that the obstacle can be easily recognized.

Further, the road area and obstacle area are specified from the image picked up by the near-infrared camera 10, and on these specified areas, the unnecessary area which may not be visually recognized by the driver is specified. This prevents the obstacle from being included in the unnecessary area.

Accordingly, on the HUD 30, since the obstacle is displayed more clearly than the street light, the headlight of the on-coming car which give a large quantity of light, the driver can visually recognize the obstacle surely. Thus, a night driving view field supporting device can be provided which can more surely support the driving view, field of the driver at night.

Embodiment 5

Figure 22:
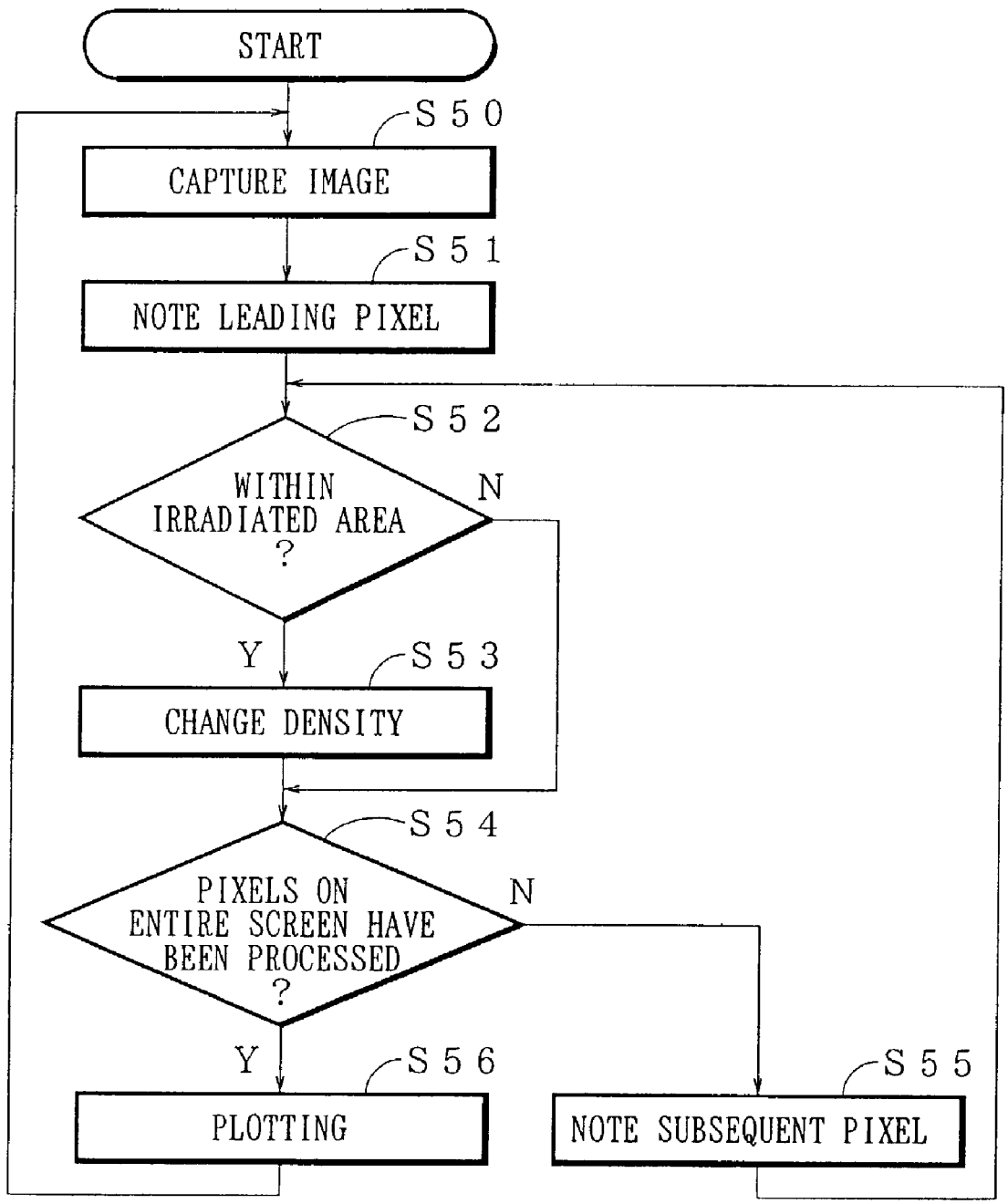
FIG. 22 is a flow chart showing an example of the processing in a fifth embodiment executed by CPU shown in FIG. 5.
Figure 23:
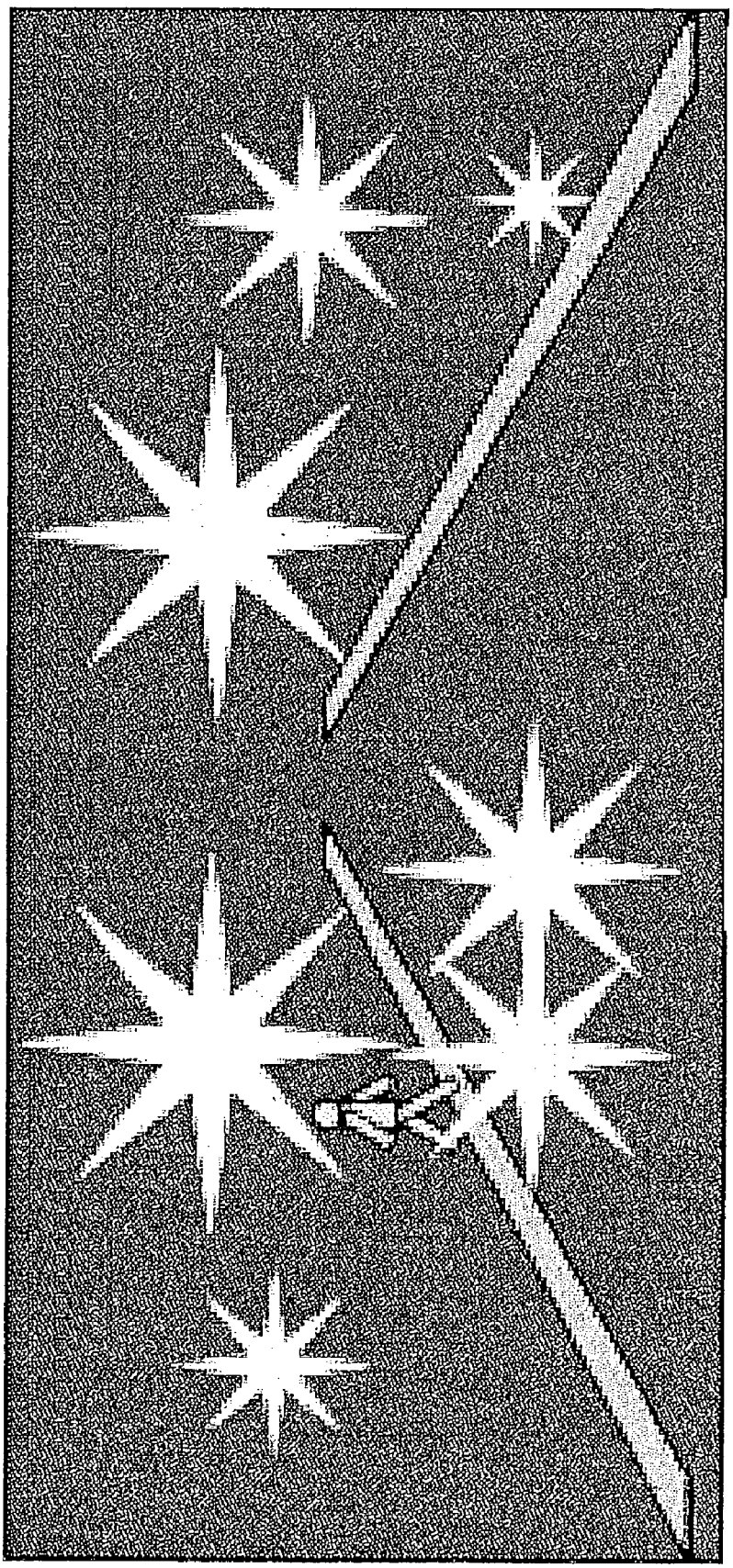
FIG. 23 is a view showing a thirteenth image for explaining the fifth embodiment.
Figure 24:
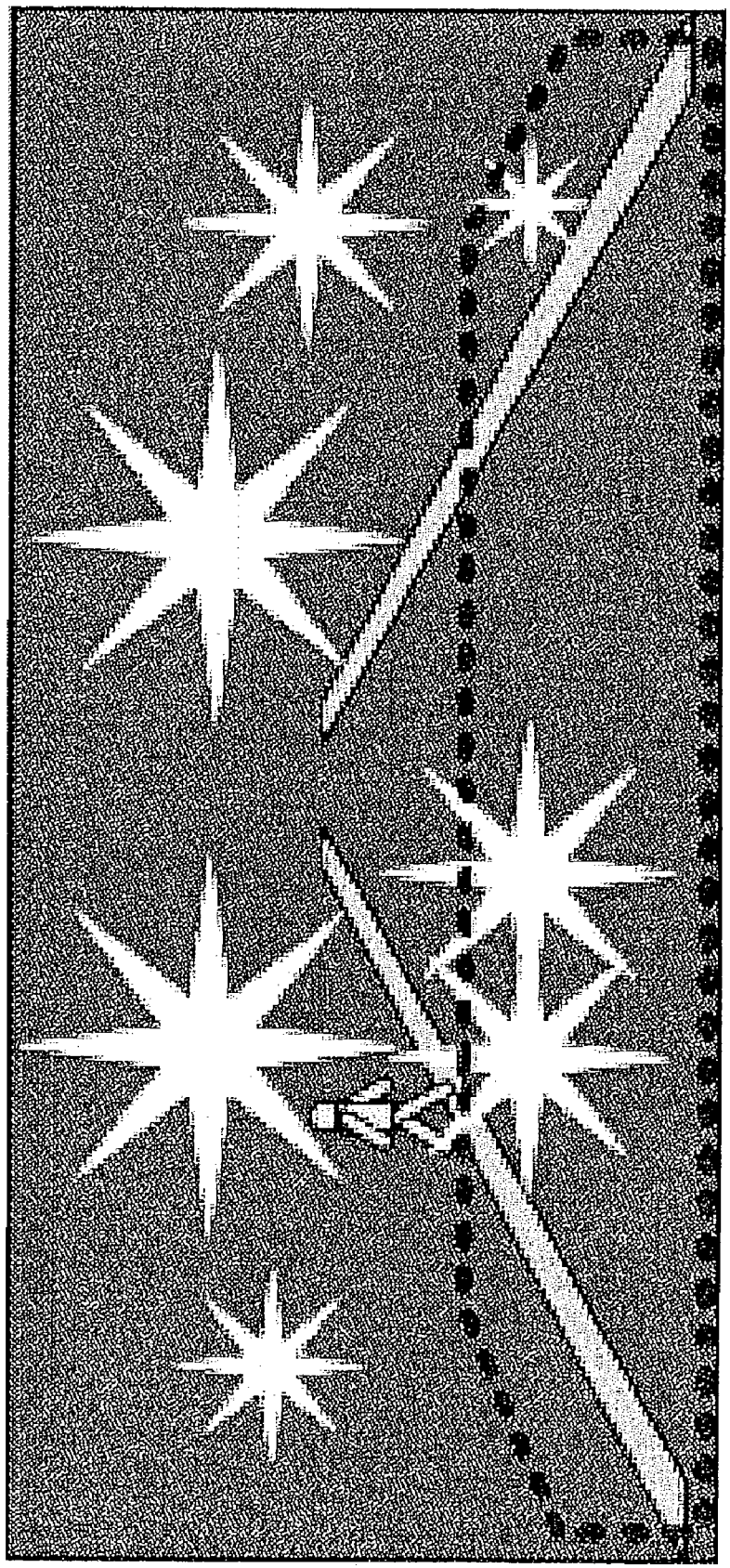
FIG. 24 is a view showing a fourteenth image for explaining the fifth embodiment.
Figure 25:
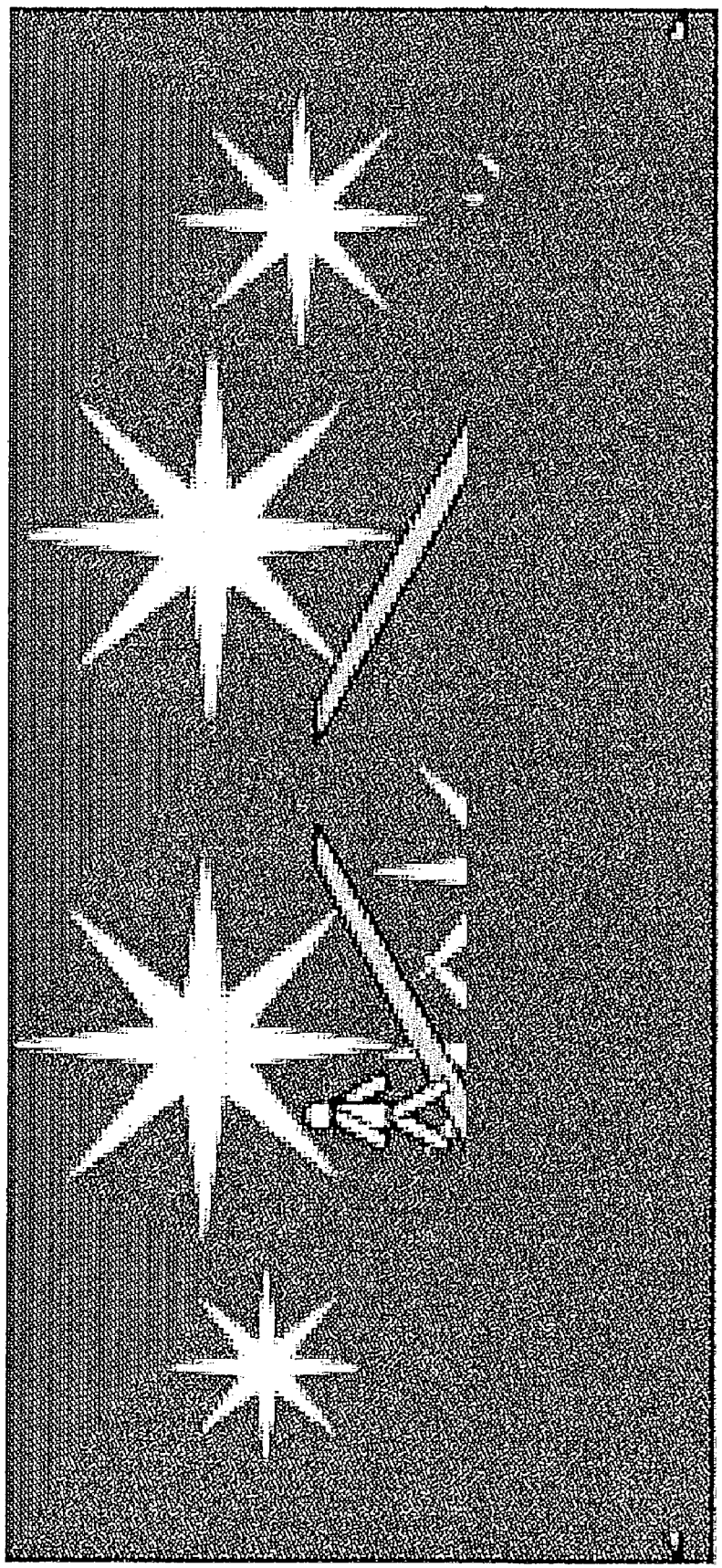
FIG. 25 is a view showing a fifteenth image for explaining the fifth embodiment.

FIG. 22 is a flowchart showing an example of the processing in a fifth embodiment executed by CPU shown in FIG. 5; FIG. 23 is a view showing a thirteenth image for explaining the fifth embodiment; FIG. 24 is a view showing a fourteenth image for explaining the fifth embodiment; and FIG. 25 is a view showing a fifteenth image for explaining the fifth embodiment.

The ROM 21b of the in-vehicle image correcting device 20 stores the program for causing the μ COM 21 (computer) to operate as the image capturing means and correcting means for correcting the image captured by the image capturing means in such a manner that the density of the pixel corresponding to the area irradiated with a headlight of one's own vehicle is lower than the obstacle density of the pixel corresponding to the obstacle, and irradiated area information on the area irradiated with the headlight of one's own vehicle on the image captured by the image capturing means. Therefore, in the fifth embodiment, the ROM 21b serves as an irradiated area information storing means described in claims.

Now referring to the flow chart of FIG. 22, an explanation will be given of an example of the processing executed by the CPU 21a of the in-vehicle image correcting device 20 according to the fourth embodiment.

When the CPU 21a is started according to an operation by the operation unit 40, in step S50 (image capturing means) the image shown in FIG. 23 picked up by the near-infrared camera 10 is captured in the RAM 21c.

Incidentally, as seen from FIG. 23, the image includes a pair of white lines directed to the center and road inside them. On the left side of the image, there is a walker (which corresponds to an obstacle) which is going to cross the road. On the upper side of the image, there are light of on-coming cars and street lights which has higher brightness at their centers (radial white areas in the figure). In this fifth embodiment, the road of "keep to the right" will be explained.

In step S51, the leading pixel of the captured image is noted and its density is sampled. In step S52, it is determined whether or not the pixel is located within the irradiated area represented by the irradiated area information stored by the ROM 21b, i.e. area encircled by black broken line corresponding to about ⅓ on the lower side of the image shown in FIG. 24. If it is determined that the pixel is not located within the irradiated area (N in step S52), the processing proceeds to step S54. On the other hand, if it is determined that the pixel is located within the irradiated area (Y in step S52), the processing proceeds to step S53.

Incidentally, in the fifth embodiment, the irradiated area information stored in the ROM 21b is the information indicative of the image area which will be irradiated with a low beam emitted from the headlight of one's own vehicle, but maybe that will be irradiated with a high beam emitted therefrom.

In step S53, the density of the pixel is changed so that it is not higher than the obstacle density prescribed in e.g. the ROM 21b. Thereafter, in step S54, it is determined whether or not the pixels constituting the entire screen has been processed. If it is determined that the pixels corresponding to the screen have not yet been processed (N in step S54), in step S55, the density of a pixel subsequent to the processed pixel is sampled. The processing returns to step S52, and the above series of steps are repeated. If it is determined that the pixels corresponding to the entire screen have been processed (Y in step S54), the processing proceeds to step S54.

In step S56, the corrected image is sent to the display device 31 of the HUD 30 through the interface 22. Thereafter, the processing returns to step S50, and a series of processing steps are repeated for a next image. Thus, on the HUD 30, as shown in FIG. 25, the image is displayed in which the light spots corresponding to the headlights of the oncoming cars below the walker (obstacle) are excluded and the light spots corresponding to the streetlights remain.

As described above, the series of processing steps S51 to S55 function as the correcting means. Therefore, the CPU 21a1 of μCOM 21 serves as the image capturing mean and correcting means.

An explanation will be given of an example of the operation of the night driving view field supporting device according to the fifth embodiment of this invention described above.

When the image as shown in FIG. 14 is picked up by the near-infrared camera 10, the image is captured into the in-vehicle image correcting device 20. In the in-vehicle image correcting device 20, the irradiated area in the captured image, i.e. the area encircled by black broken line corresponding to ⅓ on the lower side on the image shown in FIG. 24 is corrected in such a manner that the density of the pixel is not higher than the obstacle density prescribed in e.g. the ROM 21b. Thus, on the HUD 30, the image as shown in FIG. 25 is displayed in which the light spots corresponding to the headlights of the oncoming cars below the walker (obstacle) are excluded and the light spots corresponding to the streetlights remain.

As described above, since the area irradiated with the headlight of one's own vehicle can be visually recognized by the driver, the irradiated area information indicative of this area is previously stored. The captured image is corrected in such a manner that the density of the pixel corresponding to the area irradiated with a headlight of one's own vehicle is lower than the obstacle density of the pixel corresponding to the obstacle. For this reason, the image picked up by the near-infrared camera 10 can be made which permits the obstacle to be easily recognized. Thus, even when the object such as the headlights of the on-coming car which have higher luminance than the obstacle are picked up by the near-infrared camera 10, the image clearly shows the obstacle so that the obstacle can be easily recognized.

Accordingly, on the HUD 30, since the obstacle is displayed more clearly than the street light, the headlight of the on-coming car which give a large quantity of light, the driver can visually recognize the obstacle surely. Thus, a night driving view field supporting device can be provided which can more surely support the driving view field of the driver at night.

In the first to fifth embodiments described above, the configuration of the night driving view field supporting device having the in-vehicle image correcting device 20 has been explained. However, this invention should not be limited to such a configuration of the night driving view field supporting device, but may be realized in various configurations having the in-vehicle image correcting device 20 which is realized by the near-infrared camera 10, display device 31 of the HUD 30.

Further, in the first to fifth embodiments described above, the CPU 21a1 of the in-vehicle image correcting device 20 serves as the image capturing means, correcting means, defining means, adjusting means, road area detecting means, unnecessary specifying means, obstacle area detecting means and irradiated area information storing means. However, this invention should not be limited to such a construction, but may be realized in various formats using DSP (Digital Signal Processor) LSI, ASIC (Application Specific Integrated Circuit), etc.

In accordance with the in-vehicle image correcting device of this invention, if the image picked up by the near-infrared camera includes the pixel having the higher density than that of the pixel (obstacle density) corresponding to the obstacle, the image is corrected so that the density of the former becomes lower than the obstacle density. For this reason, the image picked up by the near-infrared camera can be made from which the obstacle can be easily recognized. Accordingly, even the object having a higher brightness than that of the obstacle such as the headlight of an on-coming car, street light, etc. is picked up by the near-infrared camera, the image shows the obstacle clearly so that the obstacle can be easily recognized.

In accordance with the in-vehicle image correcting device of this invention, since the obstacle density is defined on the basis of the distribution of the densities of the pixels which constitute the captured image, the obstacle density suitable to the captured image can be automatically calculated. Thus, since the image is corrected on the basis of the obstacle density suitable to the captured image, the obstacle can be recognized-more easily from a clear image.

In accordance with the in-vehicle image correcting device, the areas in each of which the pixel density becomes radially low, i.e. areas with the displayed headlight, street light, etc. are defined in the image, and the correction for the areas is made. For this reason, the objects other than the obstacle can be excluded from the image and be made inconspicuous. Thus, since the captured image is corrected into an image from which only the obstacle can be visually recognized, the obstacle can be recognized more surely.

In accordance with the in-vehicle image correcting device of this invention, when the boundary where a density difference between the adjacent pixels is detected, the density of the pixel with the higher density in the vicinity of the boundary is corrected to a lower density. By this correction, the image can be created in which an abrupt change in the density between the adjacent pixels does not appear. Further, if the density is adjusted so as to vary gradually, good appearance is obtained. Therefore, the correction is made on the basis of the obstacle density and in addition, when the density difference between the adjacent pixels exceeds a prescribed value, the adjustment is made. Thus, the correction can be made so that the density is greatly lowered. Accordingly, the obstacle can be recognized more easily from the clear image.

In accordance with the in-vehicle image correcting device of this invention, the road area is specified from the image picked up by the near-infrared camera; on the basis of the specified-road area, the unnecessary area of the image which may not be visually recognized by the driver is specified; and the specified unnecessary area of the image is corrected in such a manner that the density of the pixel is not higher than the obstacle density. For this reason, the image picked up by the near-infrared camera can be made which permits the obstacle to be easily recognized. Further, since the street lights are commonly displayed in the upper part of the screen, by specifying the unnecessary area above the road area, the objects which impedes the visual recognition can be excluded or made inconspicuous. Thus, even when the street lights along the road and others which have higher luminance than the obstacle are picked up by the near-infrared camera 10, the image clearly shows the obstacle so that the obstacle can be easily recognized.

In accordance with the in-vehicle image correcting device of this invention, the road area and obstacle area are specified from the image captured by the near-infrared camera, and the unnecessary area which may not be visually recognized by the driver on the basis of these road area and obstacle area. This surely prevents the obstacle from being included in the unnecessary area so that the obstacle can be recognized more easily.

In accordance with the in-vehicle image correcting device of this invention, since the area irradiated with the headlight of one's own vehicle can be visually recognized by the driver, the irradiated area information indicative of this area is previously stored. The captured image is corrected in such a manner that the density of the pixel corresponding to the area irradiated with a headlight of one's own vehicle is lower than the obstacle density of the pixel corresponding to the obstacle. For this reason, the image picked up by the near-infrared camera can be made which permits the obstacle to be easily recognized. Thus, even when the object such as the headlights of the on-coming car which have higher luminance than the obstacle are picked up by the near-infrared camera, the image clearly shows the obstacle so that the obstacle can be easily recognized.

In accordance with the night driving view field supporting device of this invention, if the image picked up by the near-infrared camera includes the pixel having the higher density than that of the pixel (obstacle density) corresponding to the obstacle, the image is corrected so that the density of the former becomes lower than the obstacle density, and the corrected image is displayed on the head up display 30. For this reason, the image picked up by the near-infrared camera can be made from which the obstacle can be easily recognized. Further, even when an inexpensive near-infrared camera is used, since the image is corrected by the in-vehicle image correcting device, a night driving view field supporting device can be provided by which the obstacle can be easily recognized. Accordingly, since the obstacle can be displayed on the head up display 30 more clearly than the street light and headlight of an on-coming car providing a large quantity of light, the obstacle can be visually recognized surely by the driver. This more surely supports the driving view field of the driver at night.

Incidentally, the contents of Japanese Patent Appln. No. 2001-400275 filed on Dec. 28, 2001 are hereby incorporated by reference.

What is claimed is:

1. An in-vehicle image correcting device for correcting an image picked up by a near-infrared camera ahead of one's own vehicle in which an obstacle is difficult for a driver to visually recognize, comprising:
    image capturing means for capturing the image picked up by said near-infrared camera; and
    correcting means for correcting the image captured by said image capturing means so that a density of a pixel having a higher density than an obstacle density representative of the density of a pixel corresponding to said obstacle becomes lower than the obstacle density, further comprising:
    defining means for defining said obstacle density on the basis of a distribution of densities of pixels constituting the image captured by said image capturing means,
    wherein said correcting means corrects the image captured by said image capturing means on the basis of the obstacle density defined by said defining means.

2. A night driving view field supporting device including a near-infrared camera and an in-vehicle image correcting device comprising:

a head up display on which the image picked up by said near-infrared camera and corrected by said in-vehicle image correcting device according to claim 1 is displayed so that a driving view field is supported during night driving.

3. An in-vehicle image correcting device for correcting an image picked up by a near-infrared camera ahead of one's own vehicle in which an obstacle is difficult for a driver to visually recognize, comprising:

image capturing means for capturing the image picked up by said near-infrared camera; and correcting means for correcting the image captured by said image capturing means so that a density of a pixel having a higher density than an obstacle density representative of the density of a pixel corresponding to said obstacle becomes lower than the obstacle density, wherein said correcting means corrects the image captured by said image capturing means for a specified area in which a pixel density becomes low radially.

4. An in-vehicle image correcting device for correcting an image picked up by a near-infrared camera ahead of one's own vehicle in which an obstacle is difficult for a driver to visually recognize, comprising:

image capturing means for capturing the image picked up by said near-infrared camera; and correcting means for correcting the image captured by said image capturing means so that a density of a pixel having a higher density than an obstacle density representative of the density of a pixel corresponding to said obstacle becomes lower than the obstacle density, further comprising:

an adjusting means which when a boundary is detected in which a density difference between adjacent pixels which exceeds a prescribed value for the image corrected by said correcting, means, adjusts the density of the pixel with the higher density in the vicinity of the boundary so that it becomes gradually low from the boundary over a prescribed range.

5. An in-vehicle image correcting device for correcting an image picked up by a near-infrared camera ahead of one's own vehicle in which an obstacle is difficult for a driver to visually recognize, comprising:

image capturing means for capturing the image picked up by said near-infrared camera;

road area detecting means for detecting a road area representative of a road on the image captured by said image capturing means;

unnecessary area specifying means for specifying an unnecessary area of the image which may not be visually recognized by the driver on the basis of the road area detected by said road area detecting means; and correcting means for correcting the image captured by the image capturing means so that the pixel corresponding to the unnecessary area specified by said unnecessary area specifying means has a density lower than an obstacle density representative of a density of the pixel corresponding to said obstacle.

6. An in-vehicle correcting device according to claim 5, further comprising:

obstacle area detecting means for detecting an obstacle area corresponding to said obstacle on the image captured by said image capturing means, wherein said unnecessary area specifying means specifies the unnecessary area on the basis of the obstacle area specified by said unnecessary area specifying means.

7. A night driving view field supporting device including a near-infrared camera and an in-vehicle image correcting device comprising:

a head up display on which the image picked up by said near-infrared camera and corrected by said in-vehicle image correcting device according to claim 5 is displayed so that a driving view field is supported during night driving.

8. An in-vehicle image correcting device for correcting an image picked up by a near-infrared camera ahead of one's own vehicle in which an obstacle is difficult for a driver to visually recognize, comprising:

image capturing means for capturing the image picked up by said near-infrared camera;

irradiated area information storing means for storing irradiated area information representative of an irradiated area irradiated with a headlight of one's own vehicle on the image captured by said image capturing means;

correcting means for correcting the image captured by said image capturing means so that the pixel corresponding to said irradiated area has a lower density than an obstacle density representative of the density of a pixel corresponding to an obstacle.

9. A night driving view field supporting device including a near-infrared camera and an in-vehicle image correcting device comprising:

a head up display on which the image picked up by said near-infrared camera and corrected by said in-vehicle image correcting device according to claim 8 is displayed so that a driving view field is supported during night driving.

* * * * *